United States Patent
Foster et al.

(10) Patent No.: US 7,207,069 B2
(45) Date of Patent: Apr. 17, 2007

(54) BRANCH LOCKING OF JOB TICKETS TO CONTROL CONCURRENCY

(75) Inventors: Ward Foster, Boise, ID (US); Kenneth L. Oakeson, Boise, ID (US); Brian A. Volkoff, Roseville, CA (US); Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1040 days.

(21) Appl. No.: 09/873,195

(22) Filed: Jun. 5, 2001

(65) Prior Publication Data

US 2002/0184518 A1 Dec. 5, 2002

(51) Int. Cl.
G06F 21/22 (2006.01)

(52) U.S. Cl. .......................... 726/30; 726/26; 726/27; 718/100; 718/104

(58) Field of Classification Search .............. 713/168, 713/182, 200; 709/226, 229; 710/200; 358/1.1, 358/1.9, 1.15–1.16; 399/77, 82
See application file for complete search history.

(56) References Cited

U.S. PATENT DOCUMENTS

| | | | | |
|---|---|---|---|---|
| 5,619,649 | A * | 4/1997 | Kovnat et al. | 358/1.15 |
| 6,052,684 | A * | 4/2000 | Du | 707/8 |
| 6,078,982 | A * | 6/2000 | Du et al. | 710/200 |
| 6,088,679 | A * | 7/2000 | Barkley | 705/8 |
| 6,581,097 | B1 * | 6/2003 | Lynch et al. | 709/226 |
| 6,639,687 | B1 * | 10/2003 | Neilsen | 358/1.14 |
| 6,697,784 | B2 * | 2/2004 | Bacon et al. | 705/9 |
| 6,823,513 | B1 * | 11/2004 | McNally et al. | 718/104 |
| 2002/0080400 | A1 * | 6/2002 | Hube et al. | 358/1.15 |

FOREIGN PATENT DOCUMENTS

| | | |
|---|---|---|
| EP | 1156411 | 11/2001 |
| GB | 2371392 A | 7/2002 |
| JP | 7253858 A | 10/1995 |

OTHER PUBLICATIONS

"JDF Specification Draft Spiral 4.0", Copyright 2000, Retrieved from the Internet on Jan. 28, 2005: <URL:http://www.job-definition-format.org/JDFSpec4_1a.pdf>.*
Silberschatz et al, "Operating System Concepts", Jan. 1995, Addison-Wesley, 4th Edition, pp. 190-197, 445-446, 471-472.*

* cited by examiner

*Primary Examiner*—Gilberto Barron
*Assistant Examiner*—Minh Dinh

(57) ABSTRACT

To control concurrent access problems, the job ticket service may employ branch locking features, that is, the capability to lock a job ticket at the branch level. The branch locking may be accomplished by one of several methods. The work flow controller may assign one or more specific processors to perform the tasks identified with the branch to be locked. Where more than one processor is authorized access to the same branch, the job ticket service may lock the branch when one of the authorized processors actually acquire the branch. The job ticket service may lock the branches by setting a lock/unlock flag for each branch. Processors accessing the job ticket may then review the lock/unlock flag status to determine if the branch may be accessed. In some circumstances, the job ticket service may allow access only to those branches that are unlocked. A processor that has completed a task defined by the branch may need to have the branch unlocked in order to modify the branch.

19 Claims, 16 Drawing Sheets

BRANCH LOCKING OF JOB TICKETS TO CONTROL CONCURRENCY

TECHNICAL FIELD

The technical field is integration and control of services in a networked environment.

BACKGROUND

Services may be provided by one or more operating units in a computer-based network. Users of the network may generate specific tasks and send the tasks into the network to be assigned to one of the operating units. For example, a user at a computer terminal may generate a printing order using a printer driver installed on the terminal. The printer driver is used to control the printing request. In another example, a user at a computer terminal may generate a printing order and send the printing order into a computer network so that the printing order is completed by a printing service. The printing order may be related to a company brochure. The printing order may contain unique requirements such as paper type, font size, layout, graphics, color, and other requirements. The user may specify that a specific printing service, such as Kinkos, prepare the company brochure. Alternatively, the computer network may include programs that suggest printing services to the user.

To control the printing job, the user's computer terminal may generate job ticket. The job ticket includes the requirements, such as the requirements listed above, and an identification of the specific job that allows the job status to be tracked through the computer network.

Use of the job ticket allows printing and similar services to be allocated to those resources (i.e., the operating units) that are best suited to completing the services. Unfortunately, current computer systems do not allow access to the wide variety of services existing in networked computer systems, such as the Internet. In addition, current systems require users to have some knowledge of the existing resources, and may require users to include applicable programming to communicate with the services. Furthermore, current systems do not allow a job request to be split among several processors. As a result, completion of the job request may take longer than necessary, and may not be completed in the most efficient, lowest-cost manner.

SUMMARY

To overcome these and other problems related to use of a job ticket, a method and an apparatus allow a client to manage job attributes and processes using an electronic service center. The service center includes a job ticket service that allows access and modification of a job ticket by multiple users on a network. The method and apparatus use a network-accessible job ticket to relate to a specific job or content. The job ticket may be an object, such as an XML object, comprising routines and data. The content may be stored on the network and may be accessed by multiple job tickets. Storage and management of the job ticket are transparent to the user. The job ticket is stored in a common location in the network. The job ticket remains in the same location in the network, and users access only that portion of the job ticket required to complete a designated process. Security measures may be added to limit access to those users designated as being allowed to access the job ticket and the job file. The job ticket may include a service ID that relates the job ticket back to the originating job ticket service. In this way, a user who acquires all or part of the job ticket can refer back to the originating job ticket service (and the original, or as-modified, job ticket) to verify any changes and to ensure that the job ticket being accessed is up-to-date. The job ticket also includes a job ID to refer the job ticket to a specific job.

The service center is coupled through a communications network to a front end service. The front end service allows a user to generate a service or job request. The communications network may be the Internet, or a local area network, for example.

The service center includes a service bus, to which are coupled a job store, the job ticket service, and a work flow controller. Also coupled to the service center are one or more processors that may be controlled to complete processes and tasks defined in the job tickets.

The job ticket service may generate and store the job tickets. Job content (e.g., a PDF file) is stored in the job store. With this structure, the user does not have to manage storage of the job content or to know which job store holds the job content. The job ticket service controls access to the job tickets, and, through the use of the job tickets, also controls access to job content in the job store, or elsewhere in the network. The job ticket service may create a reference to the job ticket, and may use the reference to control access to the job ticket.

By using the service center, a user may access a wide variety of services (processors) that are coupled to the service center. The service center may arbitrate among the processors to determine an optimum selection of processors to complete the tasks specified in the user's job request. The service center handles the necessary interfaces and program conversions required to allow task completion by the selected services. In this way, the user need not have any knowledge of the operating requirements of the processors.

To control concurrent access problems, the job ticket service may employ branch locking features, that is, the capability to lock a job ticket at a branch level. The branch locking may be accomplished by one of several methods. The work flow controller may assign one or more specific processors to perform the tasks identified with the branch to be locked. Where more than one processor is authorized access to the same branch, the job ticket service may lock the branch when one of the authorized processors actually acquire the branch. Locking a branch may prevent other processors from acquiring the branch.

If the work flow controller has not assigned processors to branches (i.e., any processor may access a branch at any time), the job ticket service may lock the branch when a processor acquires the branch.

The job ticket service may lock the branches by setting a lock/unlock flag for each branch. Processors accessing the job ticket may then review the lock/unlock flag status to determine if the branch may be accessed. In some circumstances, the job ticket service may allow access only to those branches that are unlocked. A processor that has completed a task defined by the branch may need to have the branch unlocked in order to modify the branch.

An electronic service center includes components that control access to a job ticket, wherein the job ticket relates to a job request to be executed by one or more processors coupled to a communications network. In an embodiment, the components include: a work flow controller coupled to the communications network, where the work flow controller defines a work flow corresponding to the job request, and defines job ticket, and where the work flow includes one or more branches; and a job ticket service that stores the job ticket, where the job ticket includes a framework specifying the branches, and where job ticket service locks a branch when the branch is accessed by a processor.

In an embodiment, a branch includes a lock/unlock flag, where the lock/unlock flag is set to lock to lock the branch, where the lock/unlock flag locks the branch to prevent branch modification. When the branch is locked, a second processor may access the locked branch in a read-only mode.

In another embodiment, a key is provided to the processor accessing the branch. To unlock the branch, the processor returns the key to the job ticket service.

In another embodiment, the processor that accesses the branch is authorized access to the branch, and the such authorization is stored with the job ticket.

In yet another embodiment, the service center includes a job store. The job store stores content corresponding to the branch. When the branch is unlocked, the processor may access the content.

In still another embodiment the lock/unlock flag provides an indication of lock status for the branch.

In still another embodiment, the job ticket service stores a data table listing branches of the work flow. When a processor access a branch, the job ticket service marks the data table to indicate the branch is unavailable for modification.

DESCRIPTION OF THE DRAWINGS

The detailed description will refer to the following figures in which like numerals refer to like items, and in which.

DETAILED DESCRIPTION

Figure 1:
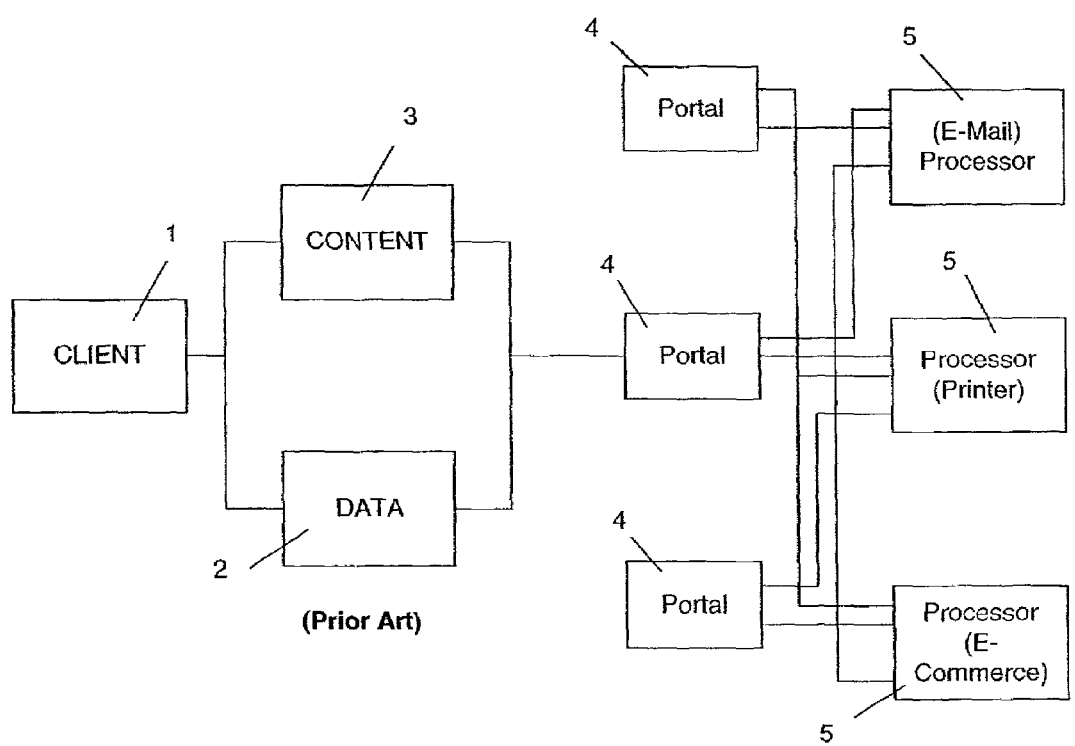
FIG. 1 is a block diagram showing a prior art use of a job ticket.

FIG. 1 is a block diagram showing a prior art application of a job ticket service. Job tickets are often associated with a printing standard, the job definition format (JDF). The JDF is described in detail in JDF Specification Draft Spiral 4.0, available on the World Wide Web at URL hp_opensource.com, which is hereby incorporated by reference. In FIG. 1, a user 1 generates a job request and sends the job request through a portal 4 to a processor 5. The job request may include a job ticket data file 2 and a content file 3. The user 1 may be a computer terminal in a networked computer system and the processor 5 may be a networked printer. The job request may involve printing a document. The document may be represented by the content 3, which is a digital representation of text and images to be printed. The intended format of the printed document may be described in the job ticket file 2, which is simply a digital file that specifies how the printer is to print the document. For example, the job ticket 2 may require that the document be printed on back-to-back pages.

In a specific application, the functions of the job ticket file 2 maybe carried out by a printer driver. The printer driver encodes control data related to printing the document, and sends the control data and the content 3 to the printer (i.e., the processor 5). The printer accesses the control data and the content 3 to print the document.

While the application shown in FIG. 1 works well to print a document, the application has many drawbacks. In particular, if multiple processors are involved in producing the document, each such processor will require access to the job ticket file 2. This access brings problems related to security, modification control and workflow control. For example, each processor requiring access to job ticket file 2 may have to wait on processing until a prior processor has completed use of the job ticket file 2. Thus, the prior art application may result in unwanted delays in completing the job request.

Prior art applications of job ticket services also suffer because the user may not know anything about the processors, including capabilities and availabilities of the processors, or even if the processors exist. Thus, the user may not know which portal to use to connect to a specific processor.

These and other problems are solved by a method and an apparatus that controls access to a job ticket and associated content through use of a job ticket service. The job ticket service includes mechanisms that arbitrate access to the job ticket among multiple users of the job ticket, limit access to the job ticket by incorporating security features, and ensure modifications made by one processor or user are reflected in the job ticket and the content. In effect, the apparatus includes a generic database that couples input data from clients as job requests with output services such as processors that perform tasks or processes to complete job requests. The database may have the features of a generic XML database in that it is extensible, and in that the clients need not have any knowledge of the individual processes to be performed, or the internal programming requirements of the processors. Thus, the clients may submit job requests to a service center that will ensure that an appropriate processor or processors are assigned to complete the job request.

Figure 2:
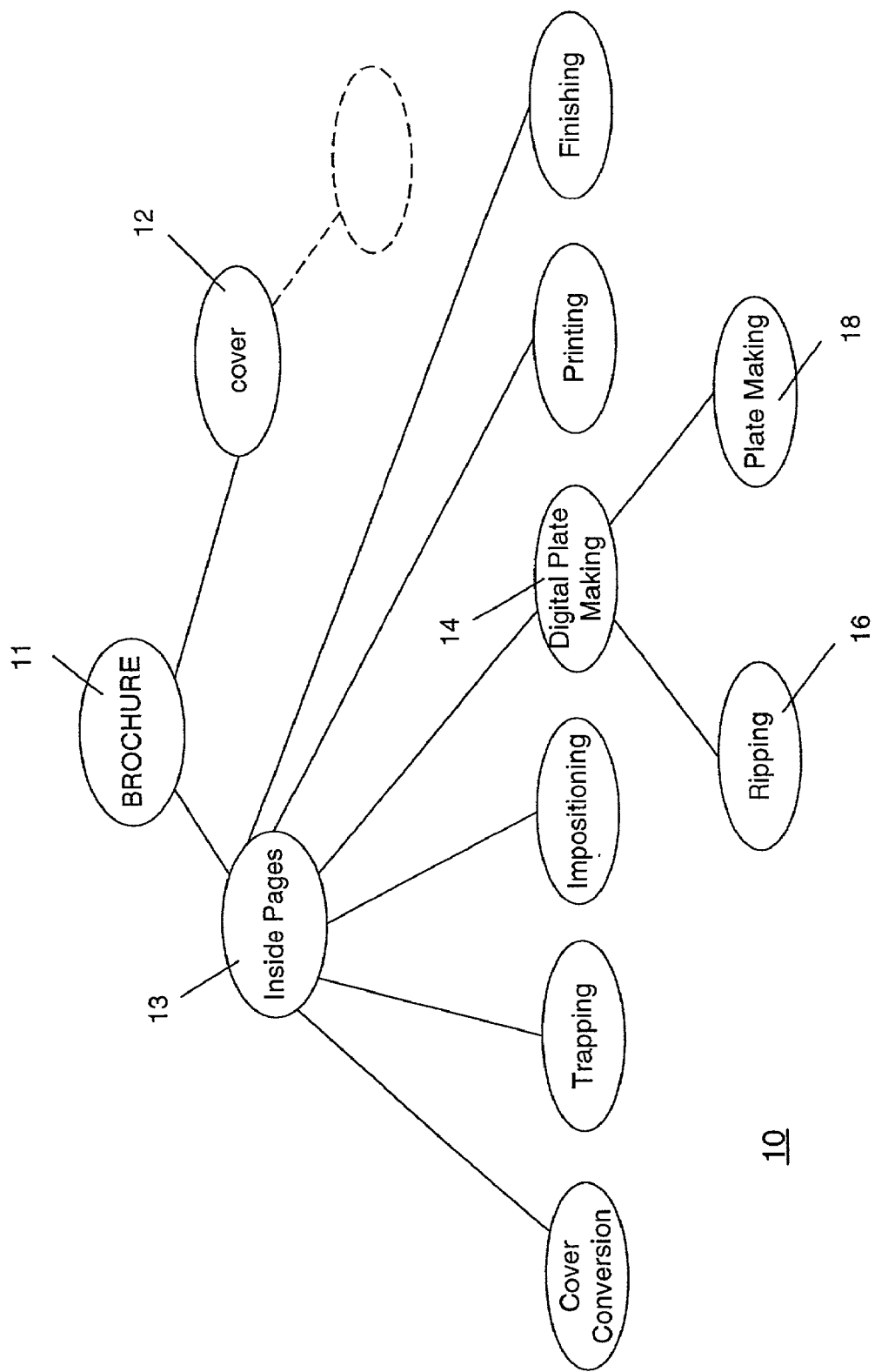
FIG. 2 is a tree diagram showing the processes in an example job ticket.

Before describing the apparatus and method in detail, a review of a job ticket is provided. FIG. 2 is a node-tree diagram (or simply a node tree) 10 that illustrates processes defined in a job ticket for printing a brochure. The brochure may be printed on a commercial press, and may use digital content to generate plates for printing the brochure. Within the node tree 10, the nodes specify a product, process, or group of processes. Each node may modify, consume or create resources. Each node may contain further nested nodes, or sub-nodes. The arrangement of nodes and sub-nodes may be likened to a tree, and each node and sub-node may be referred to as a branch. A brochure node 11 defines the features and parameters of the brochure. A cover node 12 defines the parameters for producing the brochure cover. Inside pages node 13 includes the parameters to produce the inside pages. The inside pages node 13 is shown with several sub-nodes, including a sub-node 14 for digital plate making. The digital plate making sub-node 14 itself includes two additional sub-nodes, a ripping sub-node 16 and a plate making sub-node 18.

Each of the nodes and sub-nodes shown in FIG. 2 has associated with it input resources and at least one output resource. A resource may be described by parameters or logical entities. The resource may be a physical entity such as a component, a handling resource, or a consumable. A component resource may be the output of a node or sub-node, such as a printed sheets. A handling resource is used during a process, but is not consumed by the process. A consumable resource may be partly or wholly consumed by the process. Examples of consumable resources include inks, plates, and glue. Other resources may be a digital file or representation of a physical object. For example, the ripping sub-node 16 may include as input resources a run list, media, RIP parameters, and layout. The run list resource describes the pages, including the files in which the pages occur, and which pages are to be used. The media resource describes the media that will be used to make plates, and is needed to describe the dimensions of the media. The RIP parameters resource describes all device-specific parameters of the ripping process. The layout resource describes placement of source pages onto the plates, and eventually onto press sheets. As an output resource, the ripping sub-node 16 may provide ripped flats. Other resources include parameter resources, which define the details of processes, as well as other non-physical computer files used by a process.

The node tree 10 shown in FIG. 2 is intended to apply to printing a document. However, node-tree diagrams may be used to represent job tickets for other services besides printing. For example, a job ticket may be used for data processing, image processing, creating and maintaining a database, electronic publishing, e-mail, and various e-commerce services. Moreover, job ticket may be used to allow different e-commerce services to interact with each other.

Figure 3:
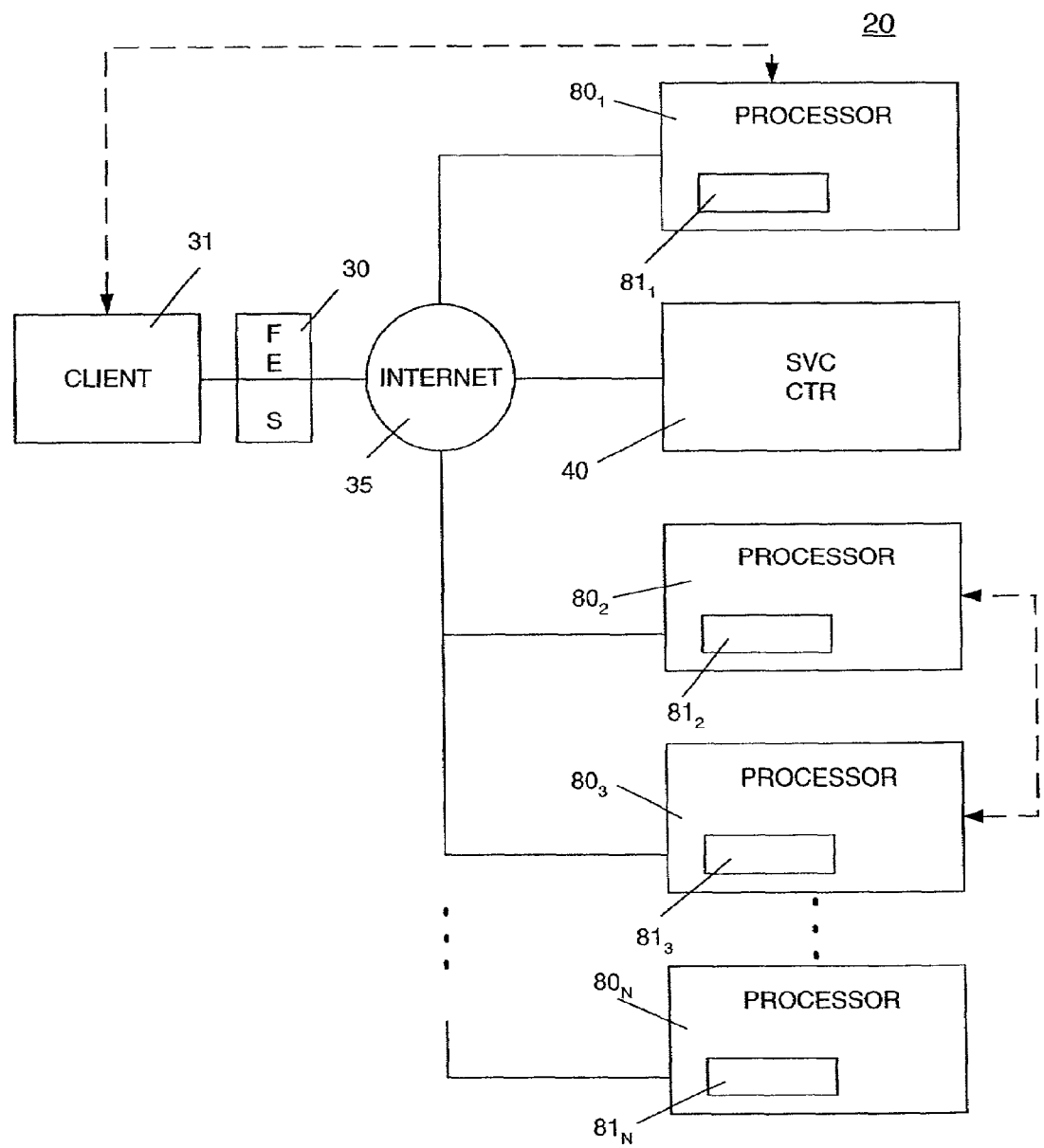
FIG. 3 is a block diagram of a digital image work flow network.

FIG. 3 is a block diagram of a digital imaging work flow (DIW) network 20 that incorporates a service center and job ticket service to control tasks submitted by clients. The service center may operate as a single portal through which the clients connect to one or more e-services including e-mail, e-commerce and online shopping, e-printing, and data services, including database searching and database construction, population and maintenance. In an alternative embodiment, the service center may comprise multiple portals. In this alternative embodiment, each of the multiple portals may be dedicated to a specific e-service. Alternatively, the multiple portals may be provided in order to increase bandwidth. Using a single portal, such as the service center, allows the clients to select from a wide variety of e-services, such as those noted above, without requiring the clients to have any prior knowledge of the e-services.

The service center may include components that receive information in the form of job requests, and using the information, create a job ticket that specifies tasks and resources. The job ticket may be stored in a job ticket service, and notices may be posted to indicate when a job ticket is available. Processors coupled to the service center may bid on completion of the job ticket, and the service center may include a bidding service that evaluates bids. The service center may select one or more processors to assign to the job ticket based on client-supplied criteria, or based on a set of standard criteria, including industry standard criteria. The service center may provide mechanisms to control access to the job ticket, or to portions (branches) of the job ticket. The mechanisms include branch locking, and authorization and authentication servers that use public key encryption, or similar processes.

The service center may include hardware components such as servers, computers, central processing units, communications interfaces, and memory devices to provide the processing capability and data storage required to carry out the above-described functions.

The DIW network 20 includes a front end service 30 that allows a client 31 to generate and submit a service or job request. In an embodiment, the front end service 30 may be an Internet web browser. Alternatively, the front end service 30 may be a web application or a port monitor. The job request may contain detailed information about how the job is to be executed, and may be formatted according to the job definition format standard. Alternatively, the job request may include only basic information, which will be used by another component to finalize the job definition, or work flow. Finally, the job request may include the content, or job, that is to be processed. The content could be one or more digital files, text files, and other files. The front end service 30 is coupled to a communications network 35, which may be the Internet or a local area network, for example. Coupled to the communications network 35 is a service center 40 that links one or more processors $80_1$ to the communications network 35. Each of the processors $80_1$ may include a cache $81_i$ that may be used to store information related to a job request, including information related to job tickets. In an embodiment, the service center 40 may be an Internet web site that includes data storage and control functions. In another embodiment, the service center 40 is a node in a local area network.

The service center 40 allows a broad spectrum of communications between entities coupled to the service center 40. In particular, the service center 40 allows different e-services to interact programmatically with one another using specific protocols and generic protocols (e.g., TCP/IP). This programmatic interaction allows different services and processes that are coupled to the network to exchange data and files, and to modify the data and files. The programmatic interaction may be completed by use of a remote procedure call (RPC) between entities coupled to the service center 40. Other methods for providing the programmatic interaction include CORBA, UDDI, and e-speak.

Figure 4:
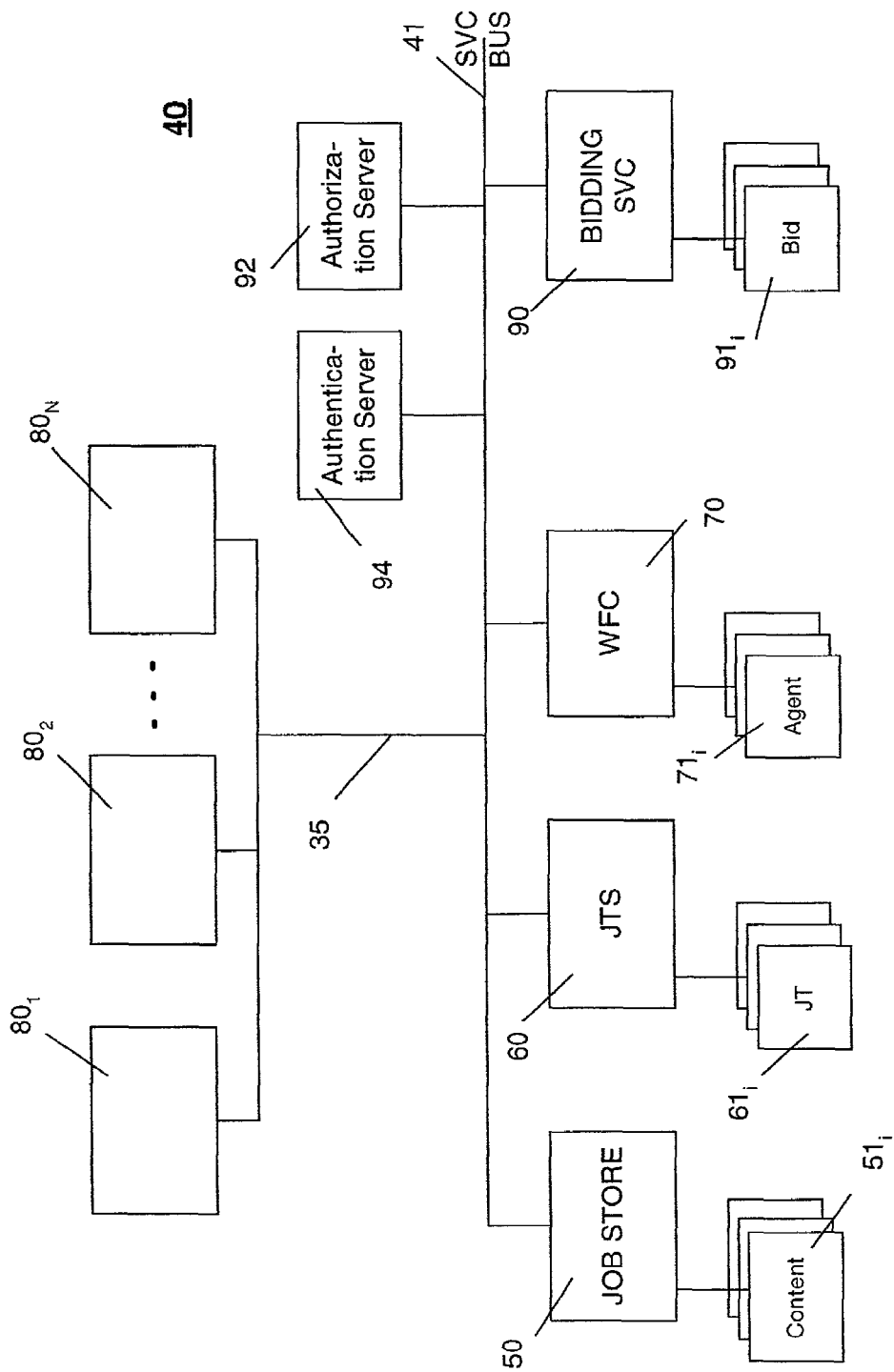
FIG. 4 is a block diagram of a service center used with the network of FIG. 3.

FIG. 4 is a diagram of the service center 40. The service center 40 includes a service bus in communication with the communications network 35 and the processors 80, of FIG. 3. Coupled to the service bus 41 is job store 50, a job ticket service 60, a work flow controller 70, an optional bidding service 90, an authorization server 92 and an authentication server 94. The job store 50 may store one or more job content files $51_1$. The job ticket service 60 may control one or more job tickets $61_1$. The work flow controller 70 may use one or more agents $71_1$ to control processes on the service bus 41.

The job store 50, job ticket service 60 and work flow controller 70 function to accept information from the clients 31, and to use the information to control the actions of the processors $80_1$. The processors $80_1$ performs specific tasks or processes as determined by the service center 40.

The job store 50 maybe anode on the service bus 41, and may include programming to allow job store 50 to carry out its functions. The job store 50 may be used to store the content 51, which may be in the form of one or more large files. In the context of printing a document using a service or process coupled to the service bus 41, the job store 50 may store the document content in one or more PDF files, for example. The content 51 may include graphics and text. The content 51 for a specific document may include several files. For example, a brochure may have a separate file for the cover and another file for the inside pages. Text for the inside pages may be in one file and images in yet another file. The content 51 may also include links to other resources or entities on the service bus 41. The job store 50 provides for mass storage of the content 51, so that a user (client 31 or processor 80) does not have to provide the mass storage required for the job content 51. By using the mass storage capabilities of the job store 50, the content 51 maybe made to persist in the network 20, and may be made accessible to users at any time. The job store 50 also manages and controls the content so that the user (client 31 or processor 80) does not have to manage the content 51. Management functions include maintaining configuration or version control of the content 51, controlling access to the content 51, and maintaining the content 51 in storage.

The job ticket service 60 holds job tickets 61. The job ticket service 60 controls access to and may manage configuration of the job tickets 61. For example, the job ticket service 60 may allow users (clients 31 and processors 80) to access a portion or branch of a job ticket 61 rather than passing the job ticket 61 among multiple users. Access to the job ticket portion may be effectuated by use of an application programming interface, a scriptable interface, or a similar feature. As noted above, job ticket 61 does not include the content 51 (e.g., the graphical and text files of a document), but job ticket 61 relates to content 51 (e.g., a PDF file) stored in the job store 50. The user does not have to manage storage of the job content or to know which job store 50 holds the job content. The job ticket service 60 instead passes a reference in the job ticket 61. This allows multiple clients 31 and processors $80_1$ to access the content 51. Furthermore, the content 51 may relate to more than one job ticket 61. The job ticket service 60, and its interrelationships with other entities coupled to the service bus 41, will be described later in detail.

Some job tickets 61 may be accessed by multiple processors $80_1$, in either serial, overlapping, or simultaneous fashion. The multiple access processing could result in problems with use of the job ticket 61. For example, a first processor may acquire job ticket 61 (or a portion or branch thereof), and perform a process specified in the work flow, which may modify the branch. Such modification may be to indicate a branch as complete, use up input resources, or create new output resources, for example. A second processor could attempt to acquire the branch, but might not "know" that the first processor had modified the branch. Alternatively, if two processors compete for the same branch, a deadlock situation might occur.

One solution to the above problems may be to lock job ticket 61 whenever a processor 80 acquires the job ticket 61. Unfortunately, locking the job ticket 61 may prevent concurrent or parallel processing and may slow down completion of the job request.

The job ticket service 60 shown in FIG. 4 overcomes these and other problems by having the capability to lock the job ticket 61 at the branch level. The branch locking may be accomplished by one of several methods. The work flow controller 70 may assign one or more specific processors $80_1$ to perform the tasks identified with the branch to be locked. Where only one processor $80_1$ is authorized access to the branch, branch locking may not be required. Where more than one processor 80 is authorized access to the same branch, the job ticket service 60 may lock the branch when one of the authorized processors $80_1$ actually acquire the branch.

If the work flow controller 70 has not assigned processors $80_1$ to branches (i.e., any processor 80 may access a branch at any time), the job ticket service 60 may lock the branch when a processor 80 acquires the branch.

The job ticket service 60 may lock the branches by setting a lock/unlock flag for each branch. Processors $80_1$ accessing job ticket 61 may then review the lock/unlock flag status to determine if the branch may be accessed. In some circumstances, the job ticket service 60 may allow access only to those branches that are unlocked. A processor 80 that has completed a task defined by the branch may need to have the branch unlocked in order to modify the branch.

In an embodiment, the processor 80 that accesses a branch, thereby causing the branch to be locked, may be provided with a key. To later unlock the branch (for example, to modify the branch), the processor 80 must return the key to the job ticket service 60.

A processor 80 that is authorized access to a specific branch 66 may pass the key to another authorized processor 80. To prevent unauthorized use of the key, the key may be encrypted. A key encryption system will be described later. By passing the key among authorized processors $80_1$, communications with the service center are minimized, thereby increasing efficiency of operation.

In another embodiment, the locked branch is locked to prevent branch modification only, and only the processor 80 holding the key described above, or otherwise authorized access for modification purposes may actually modify the branch. However, other processors 80 may access the branch in a read-only mode. To further limit access to the job ticket 61, the other processors 80 that may access the branch in a read-only mode may be listed in the task section 68 of job ticket 61.

In another embodiment, branch locking is controlled by job ticket service 60. The job ticket service may include a data table showing which of the processors $80_1$ are authorized access to specific job tickets 61 or branches 66. When a processor 80 has acquired a branch 66, for example, the job ticket service 60 may mark the data table to indicate the access. Subsequent processors $80_i$ that attempt to access the same branch 66 maybe denied access until the data table is changed to indicate that the first processor 80 no longer has access to the branch 66. Alternatively, the subsequent processors 80 may access the branch 66 in a read-only fashion.

The work flow controller 70 maybe used to create the job tickets $61_i$ that are stored in the job ticket service 60. The work flow controller 70 may review the job requests 32 submitted by the clients 31, and may then use a job ticket template to prepare the job ticket 61. The work flow controller 70 may then send the job ticket 61 to the job ticket service 60 for storage and processing.

The work flow controller 70 also controls completion of tasks among the processors 80. In an embodiment, the work flow controller 70 determines which of the processors 80 have the necessary and available resources to begin the processes listed in a specific job ticket 61. The work flow controller 70 then designates the appropriate processors $80_1$ to complete the tasks referenced by the job ticket 61. For example, if a job ticket $61_1$ requires color printing, the work flow controller 70 may determine that only processor $80_3$ is a color printer with the capacity to begin the job specified in job ticket $61_1$. This embodiment in which the work flow controller 70 determines which processors 80 to assign to a specific job ticket 61 may be especially appropriate when the network 35 is a local area network and all processors 80 are directly coupled to the local area network 35.

Alternatively, the work flow controller 70 may receive bid information from Internet-connected processors $80_i$ and may use the bid information to select the processors $80_1$ to complete the job request 32.

The work flow controller 70 may also be used to designate the various nodes, input and output resources, and other features of the node tree used to complete job request. That is, the work flow controller 70 may be used to create a construct, or work flow, such as the node tree 10 shown in FIG. 2. To accomplish these tasks, the work flow controller 70 may include one or more agents $71_1$ that write a job definition file, based on control data contained in job request 32. Alternatively, a separate management information system (not shown) maybe used to create the nodes, and to control flow of tasks to the processors 80, and other entities. In yet another embodiment, the job definitions maybe written by the client 31 that originated the job request 32.

Referring again to the node tree 10 of FIG. 2, many output resources of the individual nodes serve as input resources for other nodes. These other nodes may not be able to begin executing until all input resources are complete and available, which means that the nodes may need to execute in a well-defined sequence. For example, a process for making plates will produce press plates as an output resource that is required by a printing process. In the hierarchical organization of the node tree 10, nodes that occur higher in the node tree 10 represent higher-level, more abstract operations, while lower order nodes represent more detailed, specific processes. Moreover, nodes near the top of the node tree 10 may represent only intent regarding the components or assemblies that comprise the product, and lower level nodes provided the detailed instructions to a processor 80 to perform a specific process.

Because two node trees may not be similar, the work flow controller 70 may determine processes to be completed, the order in which the processes are completed, and the processors $80_1$ that are to complete the processes. The work flow controller 70 may use the agents $71_1$ to determine an actual work flow, considering factors such as control abilities of the processors that complete the processes, transport distances between processors, load capabilities of the processors, and time constrains in the job request, for example. The agents 71 may define the overall process using serial processing, which involves subsequent production and consumption of resources by the processors $80_i$, overlapping processing, which involves simultaneous consumption and production of resources by more than one processor $80_1$, parallel processing, which involves sharing resources among processors 80, and iterative processing, which involves a back and forth processing scheme to develop resources.

In determining which of the processors $80_1$ to assign to complete a particular job request, the work flow controller 70 may poll processors $80_i$ that are coupled to the service center 40. As noted above, the processors $80_1$ may be coupled directly to the service bus 41, or may be coupled indirectly through another communications bus, such as the Internet, for example. The polling may occur whenever a job ticket 61 is created by the job ticket service 60. Alternatively, the polling and corresponding information collection may occur on a periodic basis, and the work flow controller 70 may store information related to the processors $80_1$.

As an alternative to polling, processors $80_i$ coupled to the service center 40 may monitor the job ticket service 60. The job ticket service 60 may periodically post, in a bulletin board fashion, for example, notices for job tickets that are available for processing. The processors $80_i$ may then submit a bid for the tasks and processes defined in the job ticket notice. In an embodiment, the bids may be digitally signed. The work flow controller 70, or the separate, optional bidding service 90, may review the bids, and determine which single processor 80 or combination of processors $80_1$ would be best suited to complete the tasks and processes defined in the job ticket notice. The work flow controller 70 may control access to the bids so that only the processor 80 submitting a bid may view the bid information contained therein.

The service center 40 may include several features to provide security and to control access to the job ticket 61. As discussed above, the job ticket service 60 may include a provision for branch locking. In addition, servers may be used to authorize and authenticate a processor 80 and maintain the authorization and authentication during completion of a job request 32. The authentication server 92 receives authentication information from a processor 80 and the authorization server 94 uses the information to check authorization functionality. The authorization or access rights of the processor 80 maybe carried as apart of the job ticket 61. The servers 92 and 94 may be hardware devices, but need not exist in the same hardware platform, and the servers 92 and 94 need not be tightly coupled. Alternatively, the functions of the servers 92 and may be performed in programming stored in one of the components of the service center 40, such as the work flow controller 70, for example. Using the above-described features, the service center 40 may provide trusted authentication information about the processor 80 to the authorization server 94, and the authorization server 94 then performs its authority check functions.

The job ticket 61 may be signed with an industry standard public key encryption message digest (MD) signature, and may be protected by a public key encryption system. Hence, any user that has the public key may validate job ticket 61 without having to communicate with the authentication server 92. These features reduce communication between distributed server applications. The features also allow the job ticket 61 to be passed from one processor 80 to another processor 80, maintaining security, without communicating with the service center 40.

In an alternative embodiment, the job ticket 61 holds authentication/access data, allowing controlled access within the service center 40 infrastructure. Resources may be protected by passwords and other mechanisms. Access to the job ticket 61 may be similarly protected. Furthermore, processors $80_1$ with access authorization may have such access authorization invoked by listing the processors in the job ticket. The listing may be effectuated by recording a network address for the processors $80_1$, for example. The network address may be incorporated in the bid information recorded in the job ticket 61.

Figure 7:
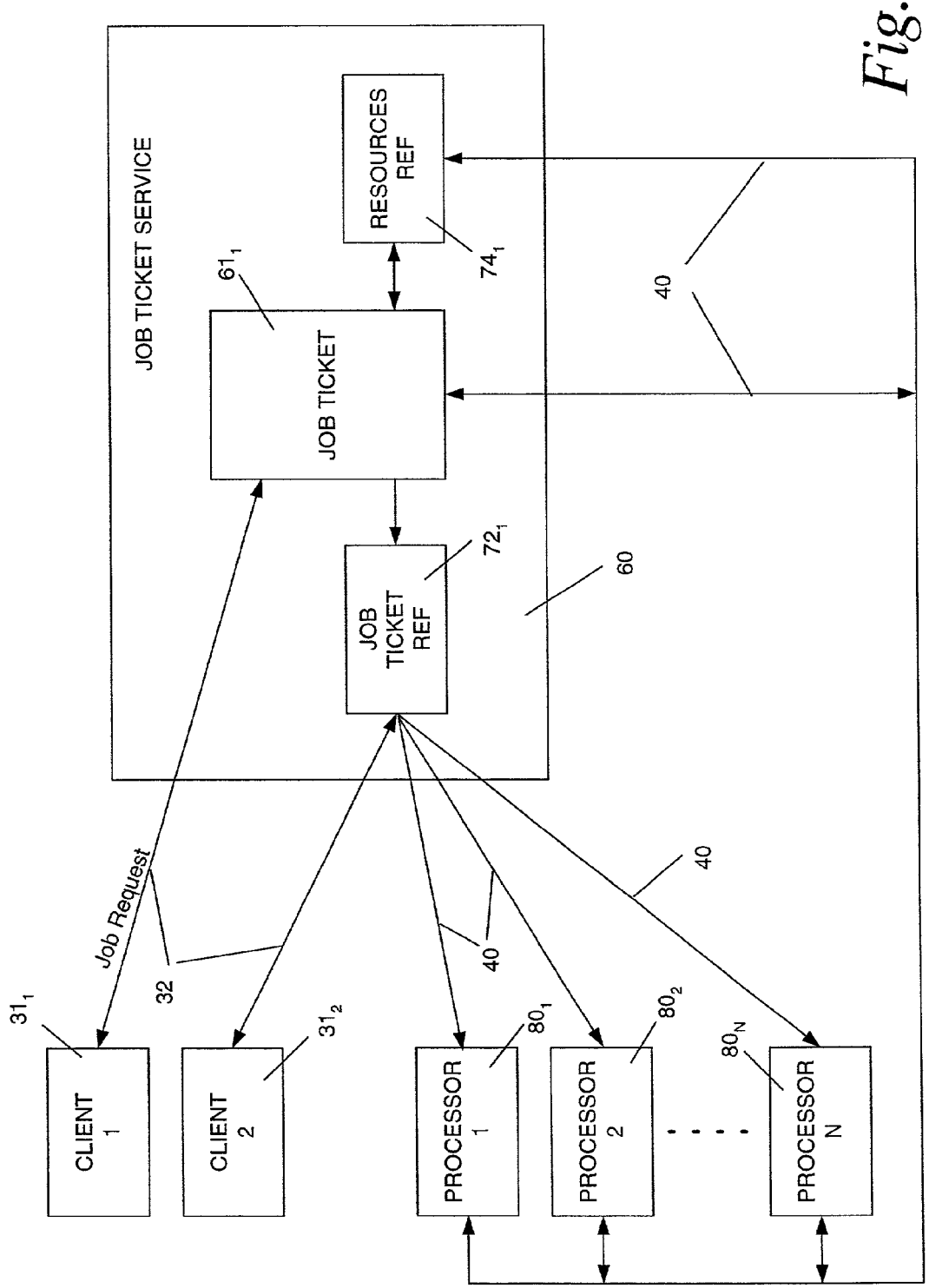
FIG. 7 is a diagram showing access functions controlled by the job ticket service.

Although the above description refers to development by the work flow controller 70, other components in the network 20 may be used to develop an overall work flow to complete the job request 32 (see FIG. 7). For example, the job ticket service 60 may be used to develop the overall work flow.

As discussed above, the bidding service 90 may be used to receive bid information from processors $80_1$ coupled to the service center 40. The processors $80_1$ submit bids in response to posting of job ticket notices at the service center 40. In an embodiment, the job ticket notice is a separate object stored in the service center 40. In another embodiment, the job ticket 61 itself serves the notice function. The work flow controller 70 may post the job ticket notices after receipt of the job request 32. Whether the bidding service 90 or the work flow controller 70 receives the bids, the bid evaluation and selection process may be the same.

The job ticket notice posted by the work flow controller 70 may include specific tasks or processes (branches) that must be completed to complete the job request 32. A simple job request 32 may have only one branch. More complex job requests 32, such as the job request illustrated in FIG. 2 (i.e., print a brochure) may have many branches. Furthermore, some branches maybe so interrelated that they can only be completed in a specific sequence, while other branches can be completed in a parallel or an overlapping fashion. This interrelationship may often be the result of one branch producing an output resource that is an input resource for one or more other branches. The job ticket notice may include descriptions of specific branches and their interrelationships in sufficient detail to allow the processors $80_i$ to bid for completion of the branches. The job ticket notice may persist in the service center 40 for a specified time to allow the processors $80_1$ to send bids. The time may be a set value (e.g., one hour) or may be based on a completion deadline specified in the job request 32.

The bidding service 90 may select bids 91 from the processors 80 based on set criteria. For example, the job request 32 may specify minimum performance requirements (e.g., a maximum cost and a completion deadline). The bidding service 90 may reject any bids that fail to satisfy the minimum performance requirements. Where the work flow controller 70 has established multiple branches, each such branch may include minimum performance requirements. The branch-specific performance requirements may be established by the work flow controller 70 based on overall performance requirements for the job ticket 61. A processor 80 that bids on a particular branch may be rejected by the bidding service 90 if the processor 80 fails to meet the minimum performance requirements.

If the client 31 does not specify any minimum performance requirements, the bidding service 90 may apply a standard set of criteria (e.g., an industry standard). In addition, the bid must satisfy any requirements for producing output resources. In this way, bids that are made in error, or that would otherwise likely be rejected, can be screened out. For example, a bid for printing inside pages of the brochure may indicate a one year completion date. Such a bid may be rejected, even in the absence of any specified performance requirements from the client 31.

In addition to submitting performance requirements, the client 31 may specify an evaluation algorithm for evaluating bids. For example, the client 31 may specify that cost is to be weighted twice as much as any other performance requirement.

In the absence of a client-specified evaluation algorithm, the bidding service 90 may apply a standard evaluation algorithm in order to rank bids for each branch in the work flow. The evaluation algorithm may apply weighting criteria, or may apply a default rule. For example, bids may be ranked based on a maximum score, where points are awarded for cost estimates below a maximum and for completion times below a maximum. Once the evaluation algorithm has been applied, the bidding service 90 ranks the bids for each branch. If only one processor 80 survives the process, that processor 80 may be automatically selected and assigned to the branch. If multiple processors 80 survive, the bidding service 90 may provide a list of such processors $80_i$ to the work flow controller 70, which will then select the processors $80_i$ to be assigned to the branches. Alternatively, the list may be provided to the client 31, and the client 31 may select the processor(s) $80_1$ to complete the tasks defined in the work flow.

The work flow controller 70 may associate winning bids with corresponding branches, and may store the bid information with the job ticket 61. The stored bid information may include identification information that allows the authorization server 94 and the authentication server 92 to permit access to job ticket branches or to the entire job ticket 61. Because the bid information is stored with the job ticket 61, a processor 80 may access those branches for which the processor 80 is authorized access without having to communicate directly with the job ticket service 61. This feature allows the job ticket 60 to be passed from one processor 80 to another processor 80, which improves processing time and efficiency.

In an embodiment, the work flow controller 70 accesses control data of the job ticket 61 to determine which processor(s) $80_i$ should be assigned to the specific task identified in job ticket. The work flow controller 70 may also identify which of the processors 80 would be able to meet the criteria specified in the control data, and may provide a list of such processors 80 to the client through the front end service 30. The client 31 may then select a processor(s) 80 from the list.

The job ticket servic, in an embodiment, may be implemented as a sequence of programming instructions recorded on a machine-readable device, such as a CD-ROM, for example. The machine-readable device is then read by a computer processor, which executes the sequence of programming steps to perform the functions of the job ticket service.

Figure 5C:
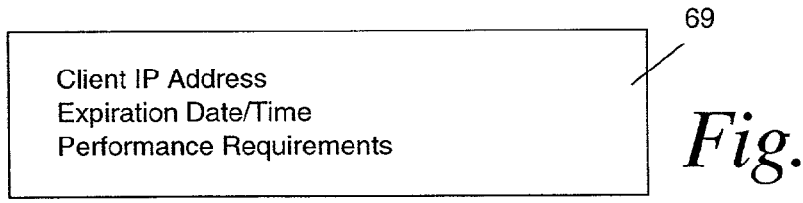
FIGS. 5A–5D illustrate an exemplary job ticket.
Figure 5A:
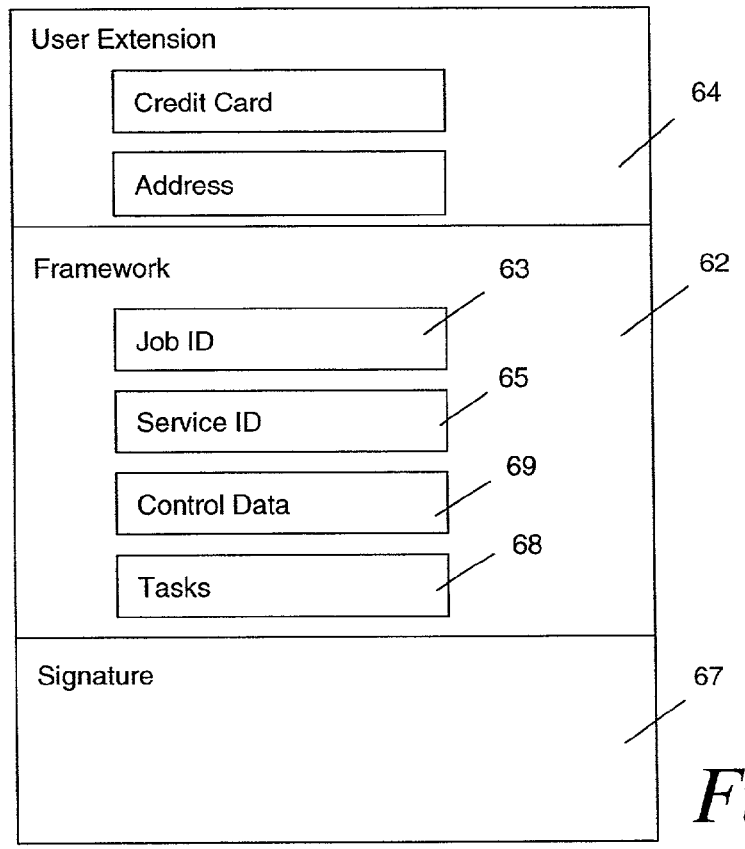

FIG. 5A illustrates an exemplary job ticket 61. The job ticket 61 may include two parts. A first part includes a framework 62 and an optional client extension 64. The framework 62 includes information, files and programming necessary to control tasks defined in the job ticket 61. The client extension 64 may include information related to a specific client (machine) and to a user of the machine. A second part includes a security module 67 that protects job ticket 61 from unauthorized access.

The framework 62 may include a job identification (ID) 63, a service ID 65, a task section 68, and a control data section 69. The job ID 63 includes a reference to a specific job, or content 51 that is stored in the job store 50. The job ID 63 also includes a reference to a particular job store 50 that is used to store the content 51. An entity that acquires a reference to the job ticket 61 can use the job ID 63 to access the corresponding content 51. Thus, the network 20 shown in FIG. 3 may include multiple job stores 50, and the job ID 63 may be used to correlate the job ticket 61 to a specific job store 50. The service ID 65 identifies a specific job ticket service 60 that stores the job ticket 61. For example, the network 20 may include multiple job ticket services 60 (not shown in FIG. 3). The service ID 65 is used to correlate the job ticket 61 to the appropriate job ticket service 60.

The tasks section 68 (FIG. 5B) may include branch definitions, and other information needed to control completion of the branches. The tasks section 68 may be structured so that each branch or node in a node tree is represented by one or more branches $66_1$ in the tasks section. In this embodiment, each node in the node tree (e.g., the node tree 10 of FIG. 2) can be associated with the node, the description 95, resources 96, lock/unlock flag 97, and security features 99. In this way, the job ticket 61 reflects a hierarchical database structure.

The control data section 69 includes the specific instructions, parameters, and criteria for completing the task identified by the job ticket 61. Control data in the control data section 69 may also be associated with each node in a node tree.

The security module 67 controls access to a specific job ticket. The security module 67 may be implemented using standard encryption and access techniques, including public/private key infrastructures, for example.

The client extension 64 may contain "custom" information, such as user age, credit card number and zip code. Information provided in the client extension 64 may be protected by use of a public key signature, or similar feature. Hence, all client extension information will automatically be included in a Message Digest Protocol (MDP) and will affect the signature of the job ticket 61. With the above-describe job ticket architecture, many Internet-related security issues are addressed, including IP spoofing, time controlled sessions, job ticket alterations, varying authorization levels, and client-dependent persistent data storing.

The job ticket 61 shown in FIG. 5A may be used to refer to a specific content 51 in the job store 50. Alternatively, multiple job tickets 61 may be used to refer a specific content 51, or one job ticket 61 maybe used to refer to multiple contents 51. Thus, for example, one job ticket 61 may specify a repetitive printing task to be completed on similar documents, each of which has a different content 51.

Using the network 20 shown in FIG. 3, and the corresponding job ticket shown in FIG. 5A, a client 31 may request and have completed many different electronic services. For example, the client 31 may use the network 20 as an e-mail application.

Figure 5B:
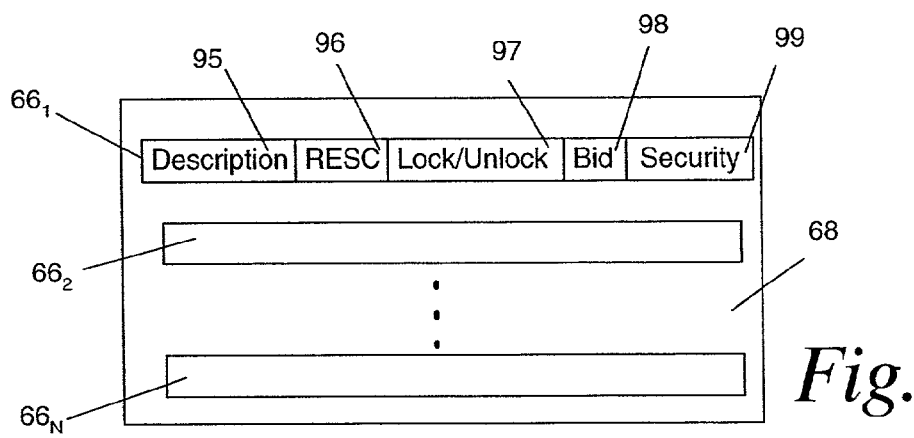

FIG. 5B shows the tasks section 68 in detail. The tasks section 68 may include one or more branch descriptors 66 that include information related to processing for that branch. A description segment 95 may define the tasks to be completed for each branch. Alternatively, the description segment 95 may provide a link, or handle, to a file that contains the branch description. The resources segment 96 lists input and output resources associated with the tasks defined for the branch. The lock/unlock flag segment 97 allows a flag to be set to lock and unlock a branch. A bid information segment 98 includes bid information gathered, for example, by the bidding service 90. The bid information 98 may include detailed information such as the IP address of the processors authorized access to the branch, estimated performance information (e.g., estimated cost, delivery time), and other information. Alternatively, the bid information 98 may contain a link to another file containing the detailed bid information. The security segment 99 may indicate authorized security levels, and may be used as part of a public key/private key infrastructure. The security functions may prevent a processor 80 accessing bid in for information from any other processors $80_1$.

FIG. 5C illustrates an embodiment of the control data section 69. The control data section 69 includes a client address, which may be a machine address, such as an Internet protocol (IP) address. An expiration date/time segment may be used to terminate active status of the ticket 61. Once terminated, the ticket may be deleted from the job ticket service 60, and the corresponding content 51 may be de-referenced. This feature may help eliminate stale data, and free up resources for other job requests 32 (see FIG. 7). In particular, this feature allows the specific job content 51 to be used with more then one job ticket $61_i$. Finally, the control data 69 may include specific performance requirements, such as cost an delivery, warranty, required materials, price reductions based on quantity, and other requirements, for example.

The use of job tickets as XML objects allows clients to define databases, and to store data through the job ticket service 60 and the job store 50. The databases may be used to hold contact lists, addresses, and other personal data. The databases may also be used to store any other generic data.

The databases could then be used in conjunction with a variety of e-services provided by the processors $80_1$. For example, an e-mail processor 80 that provides e-mail services may be used in conjunction with a personal contact list to send e-mail messages, transfer electronic files, or to establish a chat room. The e-mail processor 80 may access the contact list at predefined intervals to send e-mail messages to a select group of e-mail addressees. Furthermore, because the service center 40 provides a single portal to processors 80 that are coupled to the communications network 35, the client 31 need not have any knowledge of the database structure, or the processing requirements of the processors 80.

In the specific application of the generic XML database to an e-mail service, the client 31 may have established, as a generic database, a list of e-mail contacts. The contacts database may then be stored in the job store 50 as a content file 51. A corresponding job ticket 61 may be stored at job ticket service 61. The job ticket 61 includes control data needed to send and receive e-mail through the service center 40. Furthermore, the job ticket 61 serves as a pointer to data in the content file 51. In particular, the job ticket 61 may store XML data that is related to other data stored in the content file 51.

Alternatively, the job ticket 61 may store the contacts data. This alternative takes advantage of the fact that the job ticket 61 includes a vocabulary that can be extended to include the contact data, and that the vocabulary can be further extended to include properties for each contact in the contact data. For example, job ticket 61 may specify that a contact is a business contact or a personal contact. Other properties may also be included, such as whether the contacts in the contact database use mobile phones, land line phones, facsimile machines, and e-mail addresses.

The use of the job ticket 61 also allows for parsing, searching and updating the contacts database. For example, the client 31 may desire to search the contacts database for phone numbers for all persons whose first name is Joe. This search functionality is included in the job ticket 61, and allows the job ticket service 60 to provide the client with a list of phone numbers for all entries in the contacts database where the person's first name is Joe. That is, the contacts database includes entries having the property of Joe, and the job ticket service is able to search the contacts database for this property, and to return a list of those entries to the client 31.

The properties function of the job ticket 61 also allows job ticket service 60 to control specific tasks desired by the client 31, or to indicate to the client that a desired task cannot be completed. Staying with the example of the contacts database, the client 31 may desire to send a facsimile transmission to all entries in the contact list that have a specific zip code. The job ticket service 60 can search the contacts database by properties, looking for zip code. The job ticket service 60 can also search the contacts database to determine if any entry does not have a facsimile machine. For those entries that do not have a facsimile machine, the job ticket service 60 can originate a message to send back to the client 31, informing the client 31 that the facsimile transmission was undeliverable. Using this functionality, the client 31 need not know anything about the intended recipients of the facsimile transmission.

Returning to the example of an e-mail service, at the client 31, an e-mail application may be launched in order to send an e-mail message, using the Internet, to one or more contacts in the contact database. However, the client 31 need not subscribe to any one Internet service provider. Instead, the service center 40 determines which processor 80 best suits the client's needs for sending the e-mail message. That is, the service center 40 may select a e-mail service provider (a processor 80) to send the e-mail message to a chosen destination address. Furthermore, the service center 40 may determine, based on information maintained in the contact database (i.e., the content 51 in the job store 50), which delivery options are desired by a user at the destination address. For example, the destination address user may desire that all e-mail messages be sent to an e-mail box, or that an alert be provided whenever an e-mail message is sent. These delivery features may be stored in the contact database. Alternatively, the delivery features may be stored in a separate database (content file 51) in the job store 50, and the service center may retrieve information form this separate database when determining how to deliver the e-mail message. Specifically, the separate database may include a variety of users, along with the user's Internet address. By comparing the Internet address provided with the out going e-mail to the Internet addresses in the separate database, the service center 40 can determine desired delivery options of the addressee. This process for determining delivery options is transparent to the client 31 that originated the e-mail message. All that the client 31 need know is the contact information (e.g., the Internet address).

The client 31 may use the job ticket service 60 to specify a number of performance features related to the e-mail service. For example, the client 31 may want the service center to attempt a specified number of delivery attempts, and if delivery does not occur, to send a return message to the client 31 indicating non-delivery of the e-mail message.

Figure 5D:
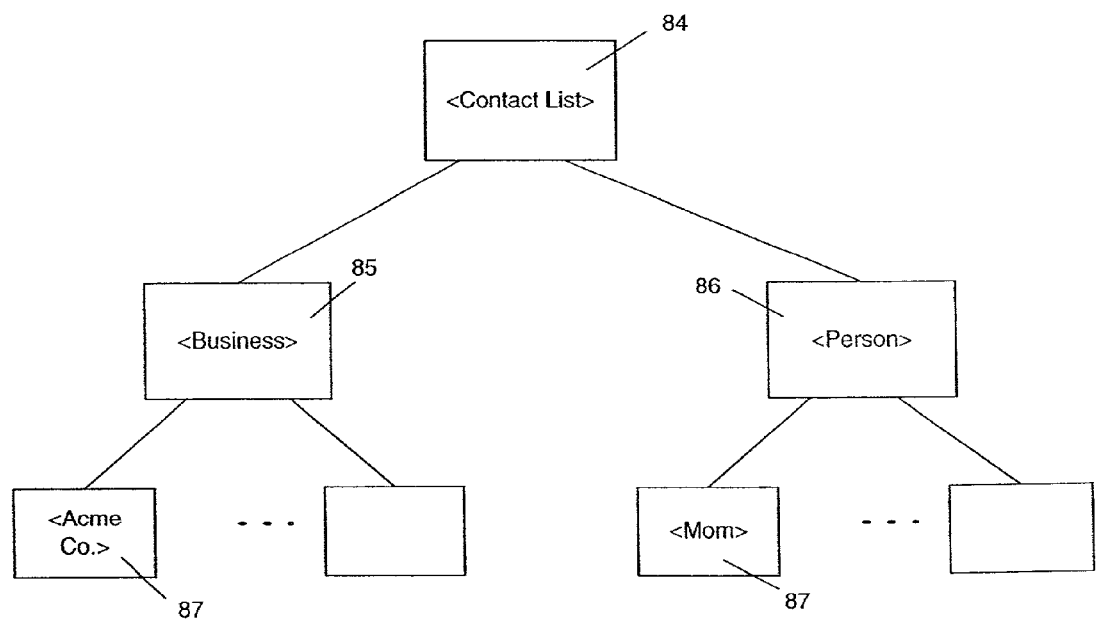

As noted above, the job ticket 61, in conjunction with other components of the service center 40, may also be used to create a persistent, generic object-based data structure, such as an XML database. An example of the use of job ticket 61 for this purpose is illustrated in FIG. 5D. The job ticket 61 includes a contacts list 84, which may be in the form of an XML database, or some other generic database. The contacts list 84 may include a structure with entries for business 85 and personal 86 use. The business 85 and personal 86 contacts structures may include entries of individuals 87, as shown. Each of the entries 87 may include specific properties, as defined above. In addition, or alternatively, each of the entries 87 may include links to other databases that provide additional information and properties about the individual.

While the use of the job ticket 61 as a XML database has been described with reference to an e-mail and messaging service, the job ticket 61 is not so limited. Any data that is capable of being stored in a database may be accesses and controlled using the job ticket 61.

Figure 6:
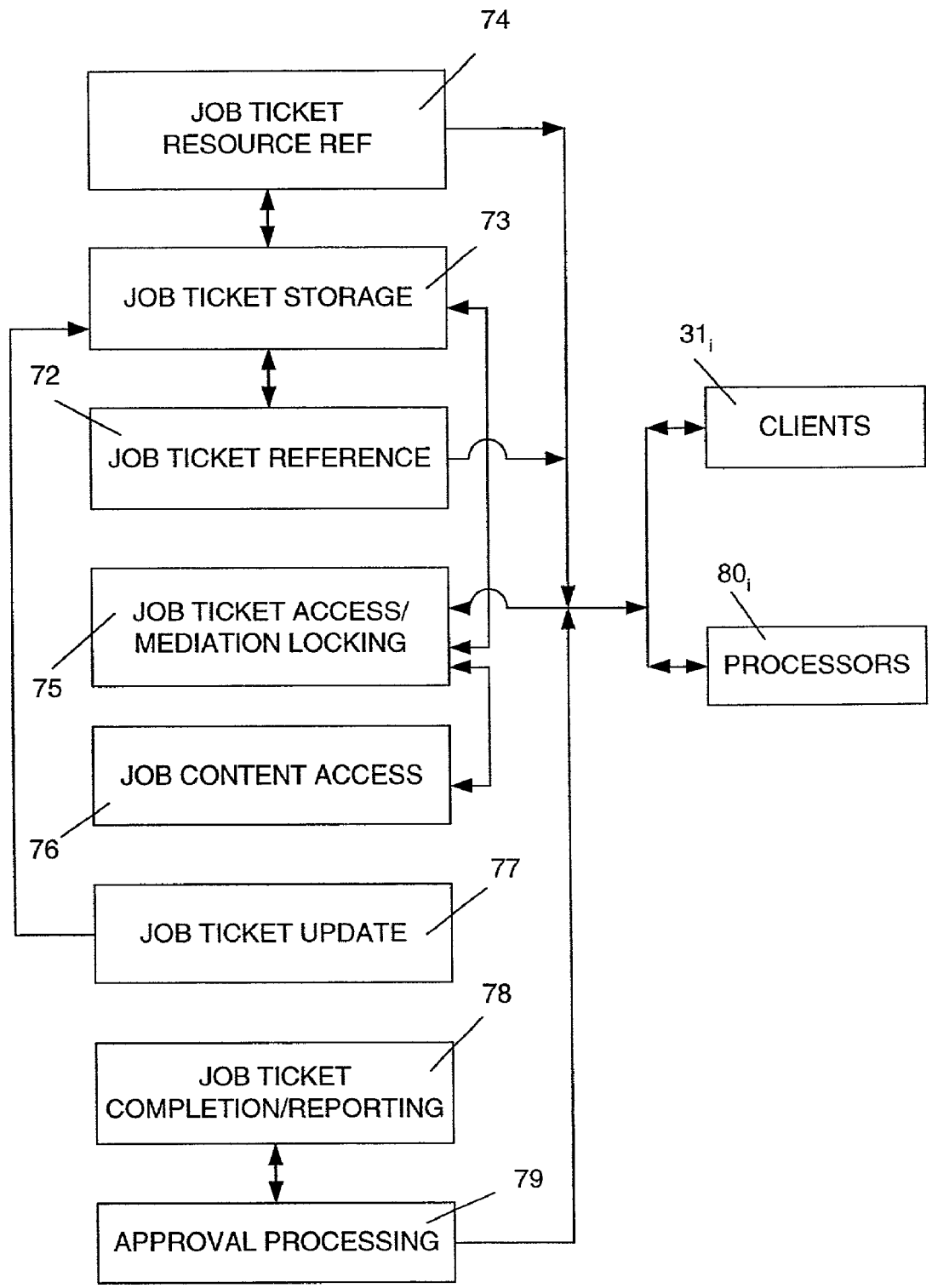
FIG. 6 is a diagram of functions controlled by a job ticket service.

The features described above, and shown in FIGS. 5A–5D, may be replicated in another embodiment of a job ticket 61 in which all data related to a specific node or branch is located with that node or branch. Using the example node-tree 10 shown in FIG. 2, each node (branch) may include detailed information and features such as resources, authorized processors $80_1$, lock/unlock flag, bid information, branch description, and other information FIG. 6 is a diagram of functions of the job ticket service 60. The primary functions of the job ticket service 60 are to store 73 the job tickets $61_1$ and to provide access 75 to the job tickets $61_1$ to users such as the client 31 and to the processors $80_1$. To accomplish these storage and access functions, the job ticket service 60 may create a job ticket reference 72 and a job resource reference 74. The job ticket service 60 also controls job content access 76, updates 77 the job tickets $61_i$ as processes are completed and reported by the processors $80_i$, completes the job ticket $61_1$ and reports 78 when all processes are completed for a specific job ticket 61, and provides an approval process 79 to allow a client 31 to approve completion of the tasks designated in the job ticket 61.

The job ticket reference 72 includes a specific reference to a corresponding job ticket 61. The job ticket reference 72 may be used by the job ticket service 60 to allow one or multiple processors and clients to access job ticket 61. That is, instead of passing job ticket 61 to a processor 80, the job ticket service 60 passes the job ticket reference 72. With the job ticket reference 72, the processor 80 may access all or apart of a job ticket 61 so that the processor 80 may complete one or more processes. Unlike conventional job ticket services, the job ticket service 60 retains the job ticket in storage 73, and only permits users (clients $31_1$ and processors $80_i$) to access the job ticket 61. This feature allows multiple processors 80 to simultaneously complete processes for the specific job request 32 related to the job ticket 61.

The job ticket service 60 may also create a resources reference 74, and may provide the resources reference 74 to the processors $80_i$ and the clients $31_i$ in a manner similar to that of the job ticket reference 72. As noted above with the description accompanying FIG. 2, the resources may include physical devices and materials, and may include digital files. Use of the resources reference 74 may simplify data included in the job ticket 61.

Alternatively, information contained in the resources reference 74 maybe included in the job ticket 61, or maybe included in other files accessed by the clients $31_1$ and the processors $80_i$.

FIG. 7 is a diagram showing operation of selected functions of job ticket service 60. As shown in FIG. 7, the job ticket service 60 includes a job ticket $61_1$, which may be a programming object such as that represented in FIG. 2, and described above. The job ticket $61_1$ is shown supplied to the job ticket service 60 by the client $31_1$. The client $31_1$ maybe a networked computer or similar device that is capable of transmitting the digital information representing the job ticket $61_1$ to the job ticket service 60. To ensure the job ticket $61_1$ arrives at the job ticket service 60, job ticket $61_1$ may contain a reference to job ticket service 60, such as the service ID 65 illustrated in FIG. 5A. The service ID 65 may include a network address of the job ticket service 60. For example, the service ID 65 may include a universal resource locator (URL) if the job ticket service 60 is an Internet web site.

Also shown in FIG. 7 are client $31_2$ and processors $80_1$–$80_N$. The processors $80_1$–$80_N$ may include networked resources such as networked printers, electronic-commerce entities, such as Internet web sites, and "brick and mortar" entities, such local print shops that are coupled to the job ticket service 60 using the service bus 41.

The client 31 generates a job request 32 (content 51 and job ticket data). Using the front end service 30 (not shown in FIG. 7) and the service bus 41, the client $31_1$ sends the job ticket data to the job ticket service 60 and the content 51 (not shown in FIG. 7) to the job store 50. The job ticket service 60 may pass the job ticket data to the work flow controller 70, which will create a job ticket 61. The content $51_1$ and the job ticket $61_1$ are related by the job ID 63. The job ID 63 also includes an identification of the job store 50, and a location within the job store 50 in which the content $51_1$ is stored. In an alternate embodiment, the content $51_1$ may be stored at the client $31_1$, and may then be accessed by other users through the service bus 41 and the front end service 30.

The job ticket $61_1$ specifies processes that must be completed to finish the job request 32. As noted above, FIG. 2 illustrates processes required to print a brochure, including the inside pages and the cover. More that one processor $80_i$ may be required to complete such a job request, or to complete the job request in the most cost-efficient and/or timely manner. The work flow controller 70 (not shown in FIG. 7) can determine which of the processors $80_1$–$80_N$ should complete a specific process, and, if necessary, the order in which such processes should be completed. The work flow controller 70 may poll the various processors $80_i$ to determine which may be used to complete job request. The work flow controller 70 may then notify selected processors $80_1$ that a job request has been registered with the job ticket service 60.

For each job ticket $61_1$ received, the job ticket service 60 creates a reference $72_1$ to the job ticket $61_1$. The processor $80_1$ may request access to the job ticket 61 in order to complete one or more processes. In response, the job ticket service 60 provides the processor $80_1$ with the job ticket reference $72_1$. The job ticket reference $72_1$ is then used as an index to the job ticket $61_1$. The job ticket reference $72_1$ may also be provided to other processors, such as the processor $80_2$, and to other clients, such as the client $31_2$. The processor $80_2$ and the client $31_2$ may then access the job ticket $61_1$ at the same time as the processor $80_1$ accesses the job ticket $61_1$. This simultaneous access allows different processes to be completed in parallel. In the example illustrated in FIG. 2, the processor $80_1$ may complete some or all the processes for the inside pages, and the processor $80_2$ may complete the processes for the cover.

Figure 8:
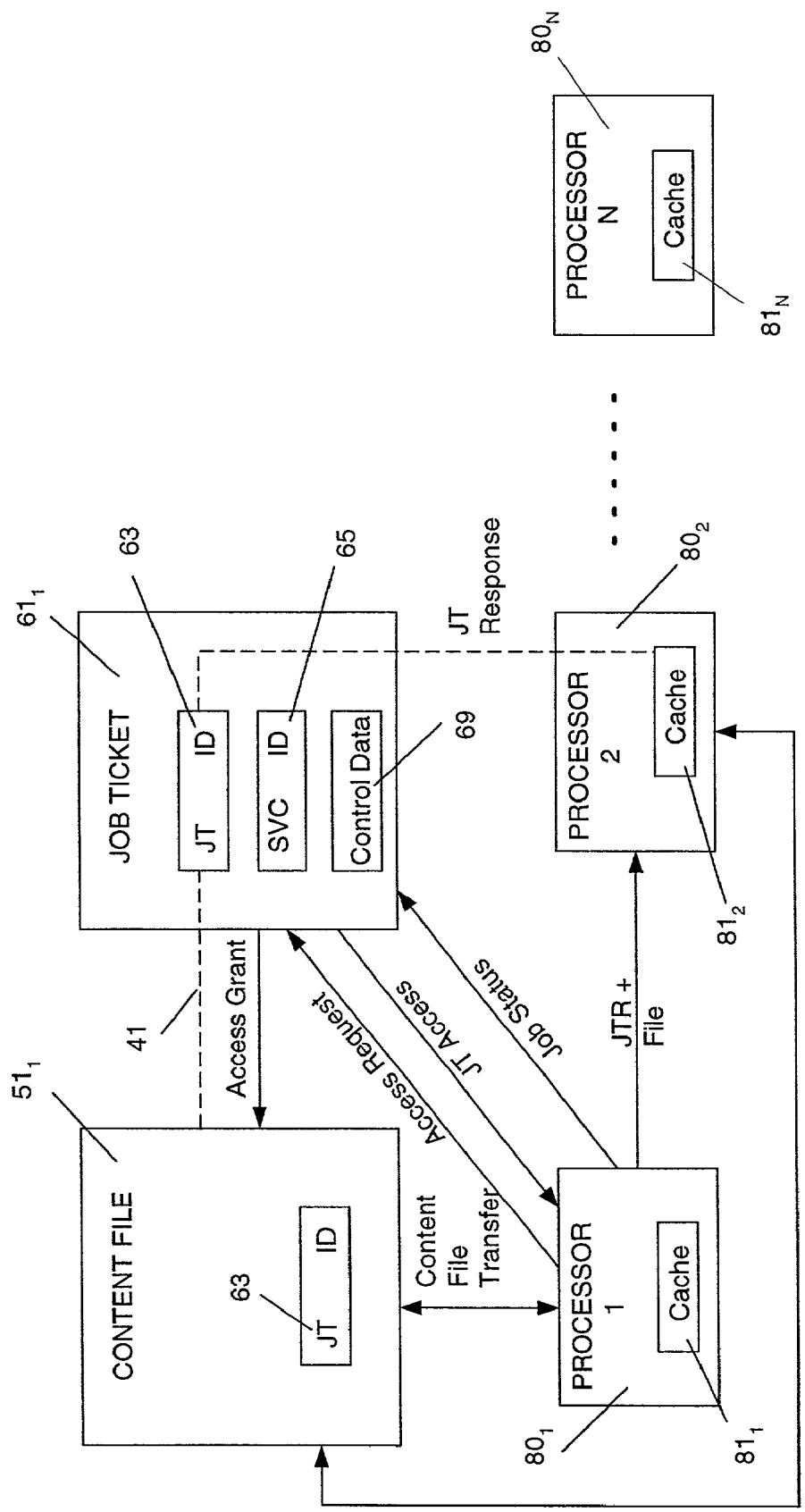
FIG. 8 is a block diagram illustrating additional control features of job ticket service.

FIG. 8 is a block diagram illustrating an example application of the control features of the job ticket service 60. The job ticket $61_1$ is referenced to the job content $51_1$ by the job ticket ID 63, and information related to the job ticket $61_1$ and the job content $51_1$ is passed over the service bus 41. The processors $80_1$ can access the job content $51_1$ and the job ticket $61_1$ using the service bus 41. In the illustrated example, the job ticket $61_1$ refers to job request 32 to print a brochure using the processes outlined in FIG. 2. The processor $80_1$ is designated by the work flow processor 70 to produce the inside pages of the brochure and the processor $80_2$ is designated to produce the brochure cover. The processor $80_1$ passes a job ticket access request to the job ticket service 60. The access request may include security information that allows the processor $80_1$ to access the job ticket $61_1$ and the corresponding content $51_1$ or job. In response, the job ticket service 60 provides a job ticket reference $62_1$ that is used by the processor $80_1$ to access the job ticket $61_1$. The processor $80_1$ may use information in the job ticket $61_1$ to access the content $51_1$ stored in the job store 50. Since the processor $80_1$ will produce only the inside pages, the processor $80_1$ will not need access to all the information contained in the job ticket $61_1$. Furthermore, because the job ticket $61_1$ remains in the job ticket service 60, other entities, such as the processor $80_2$, may continue to access the job ticket.

As the processor $80_1$ completes various processes, the processor $80_1$ may update the content $51_1$ and the job ticket $61_1$. Thus, the job ticket $61_1$ may reflect the latest status of the job request 32. The status reports may indicate when anode in the node tree 10 is completed, when an interim deadline is completed, when another processor may be used to complete a process, and when all processing is complete. The status report may be included in a digital file that is used by the work flow controller 70, for example. The status report may also be included in a human readable format, such as a pop-up window on a computer display screen. The processor $80_1$ may receive job ticket reference $72_1$, and may complete all scheduled processes, returning job ticket reference $72_1$ to the job ticket service 60. The processor $80_1$ may also send a copy of the job ticket reference $72_1$ to the processor $80_2$, so that the processor $80_2$ may access the job ticket $61_1$, and the content $51_1$ and produce the brochure cover.

Figure 9:
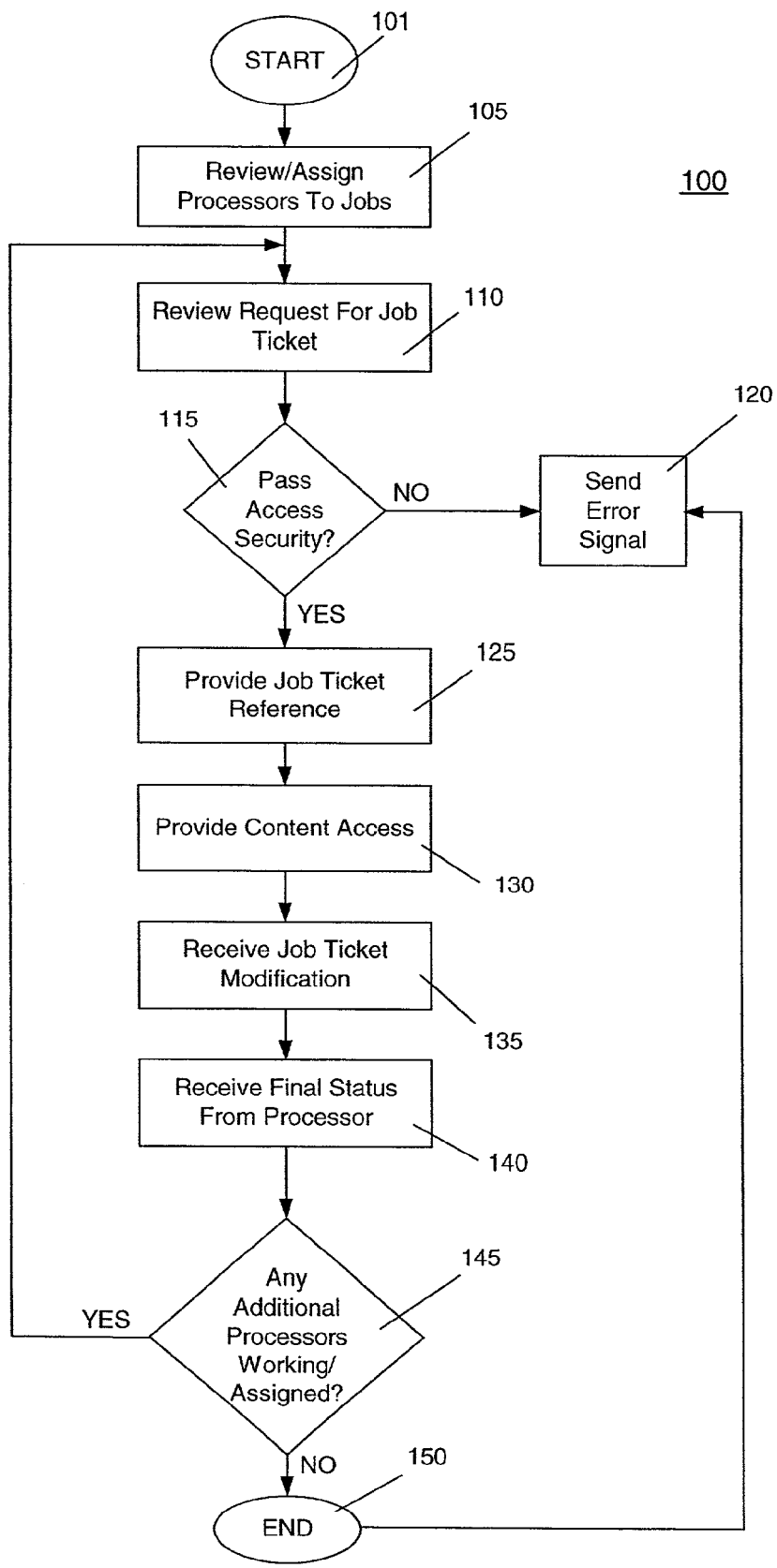
FIG. 9 is a flow chart illustrating one of the processes controlled by the job ticket service.

FIG. 9 is a flowchart illustrating an operation 100 of the job ticket service 60. The operation 100 is based on completing the inside pages nodes shown in FIG. 2. The operation 100 may be at least partly under the control of the work flow controller 70, or some equivalent device. The operation 100 assumes that a job request 32 (job ticket data and content) have been passed to the service center 40, and that a job ticket service 60 has been created. The operation 100 begins at start block 101. In review and assign processors block 105, the work flow controller 70 determines which processors $80_1$ are able and available to complete the job. The work flow controller 70, or the optional bidding service 90 may use polling or bidding features to make the determination. If more than one processor 80 is available, and can satisfy the requirements of job ticket 61, the work flow controller 70 may assign one specific processor 80 to the job. Alternatively, the work flow controller 70 may provide a list of processors $80_i$ to the client 31, and allow the client 31 to select one or more processors $80_1$.

In request job ticket block 110, a processor 80, having been authorized access to job ticket 61, sends an access request to job ticket service 60 using the service bus 41. In block 115, the job ticket service verifies that the processor 80 may access the job ticket 61. Access may be controlled by a password, an identification, and a public key/private key security system, for example. In block 115, if the processor 80 is denied access, an error signal may be sent to the processor and/or the client 31, block 120.

In block 115, if access is authorized, the job ticket service 60 provides the processor 80 with a copy of the job ticket reference 72 corresponding to the job ticket 61, block 125. The job ticket reference 72 allows the processor 80 to access the job ticket at anytime. By accessing the job ticket 61 at any time, the processor 80 is able to view an updated version of the job ticket 61 as changes are made to the job ticket 61 by other entities, including other processors 80.

In block 130, the job store 50 provides access to the job content 51 that is referenced by the job ticket 61. Only that part of the content 51 that may be needed by the processor 80 may be supplied by the job store 50. For example, if the processor 80 is only to generate the inside pages of the brochure, the job store 50 may not provide access to the content required to produce the brochure cover. After receiving job ticket reference 72 and the content 51, the processor 80 may perform one or more tasks using input resources to produce an interim or final output resource. With completion of each node in the node tree 10, the processor 80 may provide an input to the job ticket service 60 to allow modification of the job ticket 61, block 135. If the processor 80 completes all required processes, the processor 80 may provide a final status report to the job ticket service 60, block 140, along with any final modifications to the job ticket 61.

In block 145, job ticket service 60 and the work flow controller 70 determine if any additional tasking may be required. If additional tasks are required, the work flow controller 70 will ensure the appropriate processors $80_1$ are assigned, and the operation returns to block 110. If no additional processes are required, the operation moves to block 150 and ends.

Figure 10:
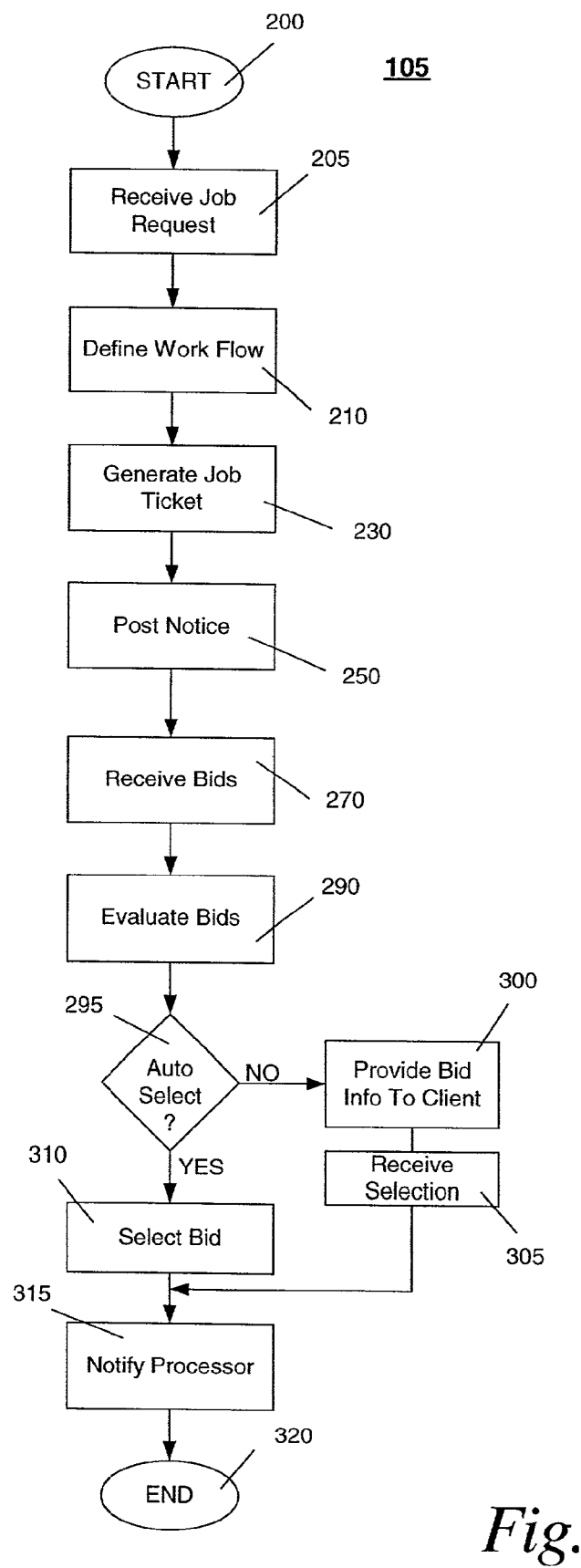
FIGS. 10–15 are flow charts showing sub-processes in the overall process illustrated in FIG. 9.

FIG. 10 is a flowchart illustrating the routine 105 for developing a work flow and assigning processors to the work flow. The process starts in block 200. In block 205, the service center 40 receives a job request 32. The job request 32 may specify performance requirements, resources, and other parameters, and may include content 51, or a link to the content 51. In block 210, the work flow controller 70 defines a work flow to accomplish the tasks specified in job request 32. The work flow may be represented by a node tree, such as the node tree 10 shown in FIG. 2.

In block 230, the work flow controller 70 generates a job ticket 61 using the information provided by the job request 32, the work flow generated in block 210, and an appropriate job ticket template. The job ticket 61 is then stored in the job ticket service 60. Any content 51 may be stored in the job store 50.

The workflow controller 70 or the job ticket service 60 may create a job ticket notice, or other object, and may post the notice, block 250, at the service center 40 so that outside entities (e.g., the processors 80$_i$) may acquire sufficient information to bid on completion of the job ticket 61, or a branch 66 of the job ticket 61. In an alternative embodiment, the job ticket 61 may be posted at the service center 40. If the job ticket 61 is posted, the job ticket 61 may include mechanism to limit access to the job ticket or to limit access to certain portions of the job ticket 61. For example, the client extension 64 may not be accessible to the processors 80$_i$.

In block 270, the service center 40 receives bids from specific processors 80$_1$ and in block 290, the service center 40 evaluates the bids. In block 295, the service center 40 determines if the client 31 submitting job request 32 intends to select the winning bid(s), or if the service center 40 makes the selection. If the client is to make the selections, in block 300, the service center 40 provides the bid information to the client 31. Then, in block 305, the service center 40 receives the selections from the client 31. If the service center 40 is to make the selections, in block 310, the service center 40 selects the winning bid(s). In block 315, the service center notifies the winning processors. The service center may also store the bid information with the corresponding job ticket 61. In block 320, the routine 105 ends.

Figure 11:
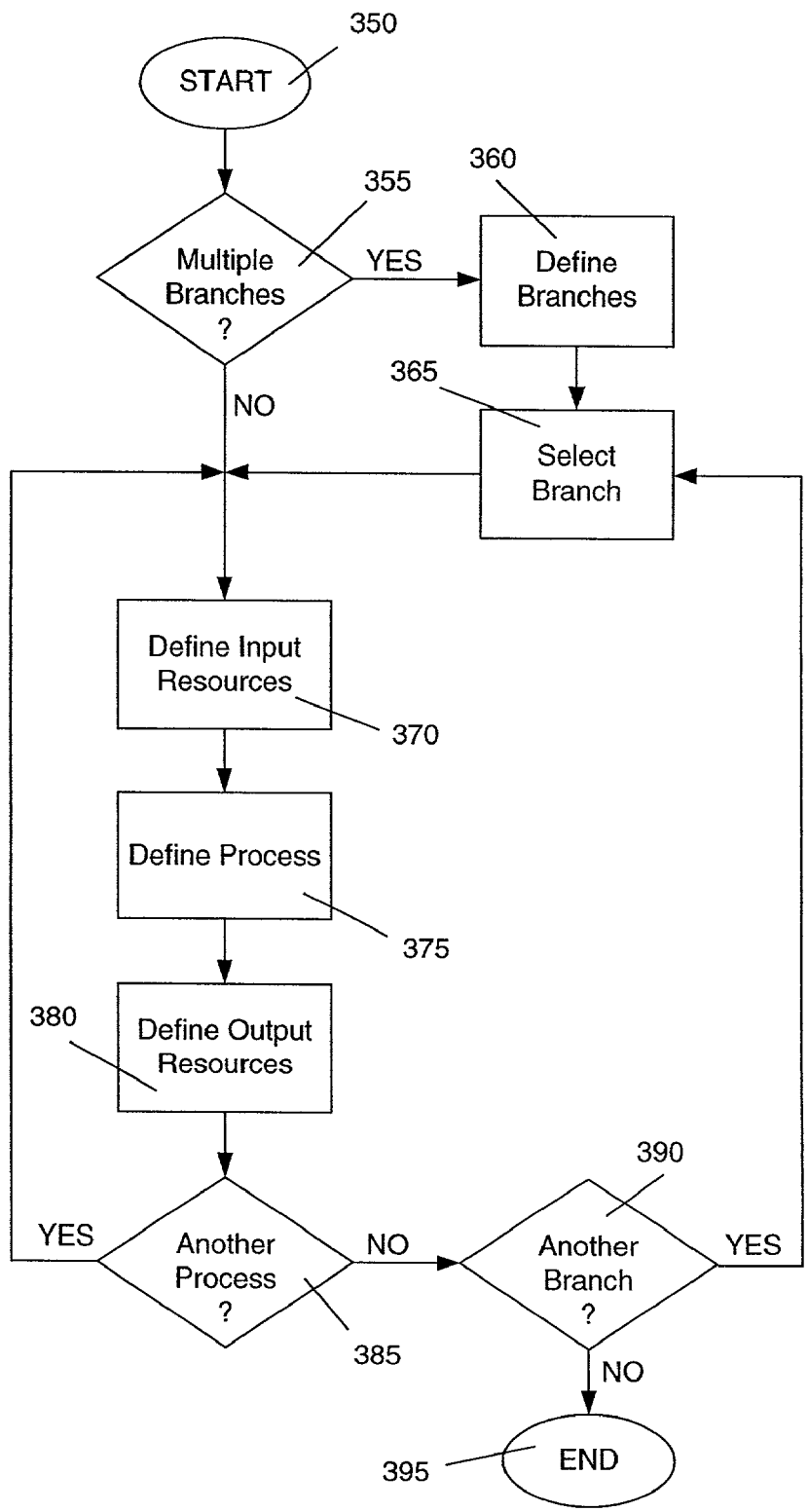

FIG. 11 is a flow chart illustrating the sub-routine 210 for defining a work flow. The subroutine 210 starts in block 350. In block 355, the work flow controller 70 determines if the work flow will contain multiple branches. If the work flow will contain multiple branches, the work flow controller 70 defines the branches, block 360. In block 365, the work flow controller 70 selects a branch for which resources and processes are to be defined. In block 370, the work flow controller 70 defines input resources for a first process, or node. In block 375, the work flow controller 70 defines the tasks to be completed for the first process. In block 380, the work flow controller 70 determines the output resources of the first process. In block 385, the work flow controller 70 determines if another process is required for the work flow or branch. In no additional processes are required, the work flow controller 70 determines if another branch is to be defined, block 390. If another branch is to be defined, the work flow controller 70 selects another branch, block 365, and the sub-routine 210 continues. If another branch is not to be defined, the sub-routine ends, block 395. The results of the work flow definition may be incorporated into the job ticket 61 (see FIG. 10, block 230).

Figure 12:
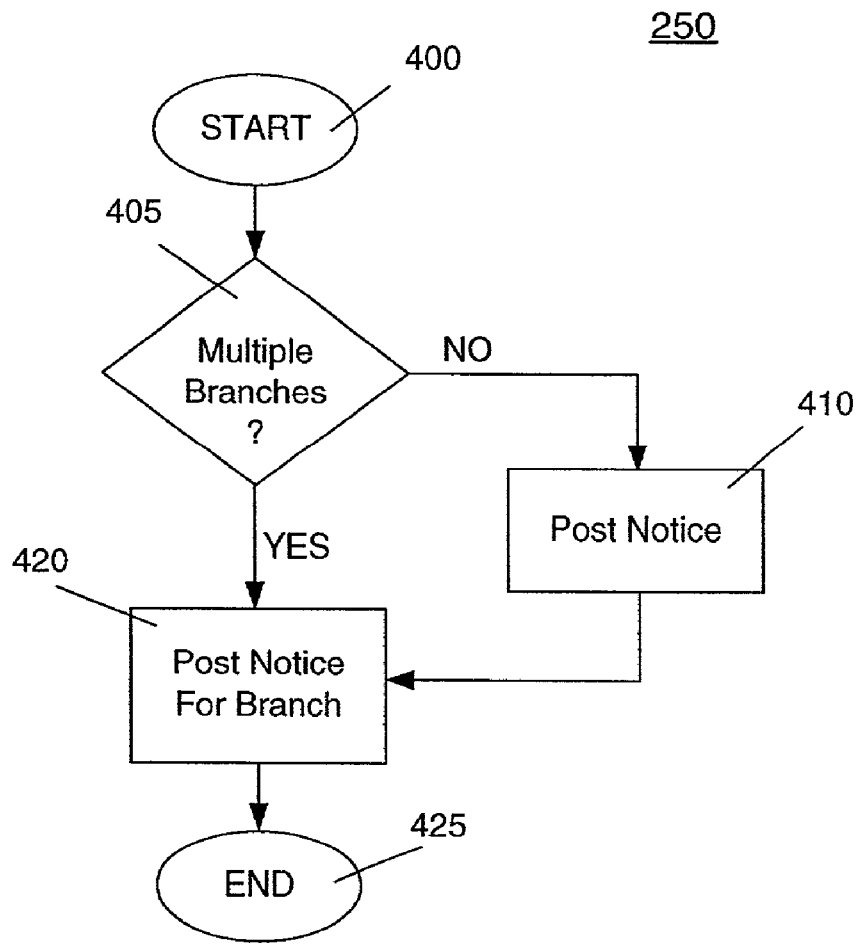

FIG. 12 is a flow chart illustrating the sub-routine 250 of posting a job ticket notice or job ticket. The sub-routine 250 starts in block 400. In block 405, the work flow controller 70 determines if the work flow associated with the job ticket 61 includes multiple branches. If the work flow does not include multiple branches, the work flow controller posts job ticket notice listing the single branch, block 410. If the work flow includes multiple branches, the work flow controller 70 posts the job ticket notice with multiple branches, block 420. The sub-routine 250 then ends.

Figure 13:
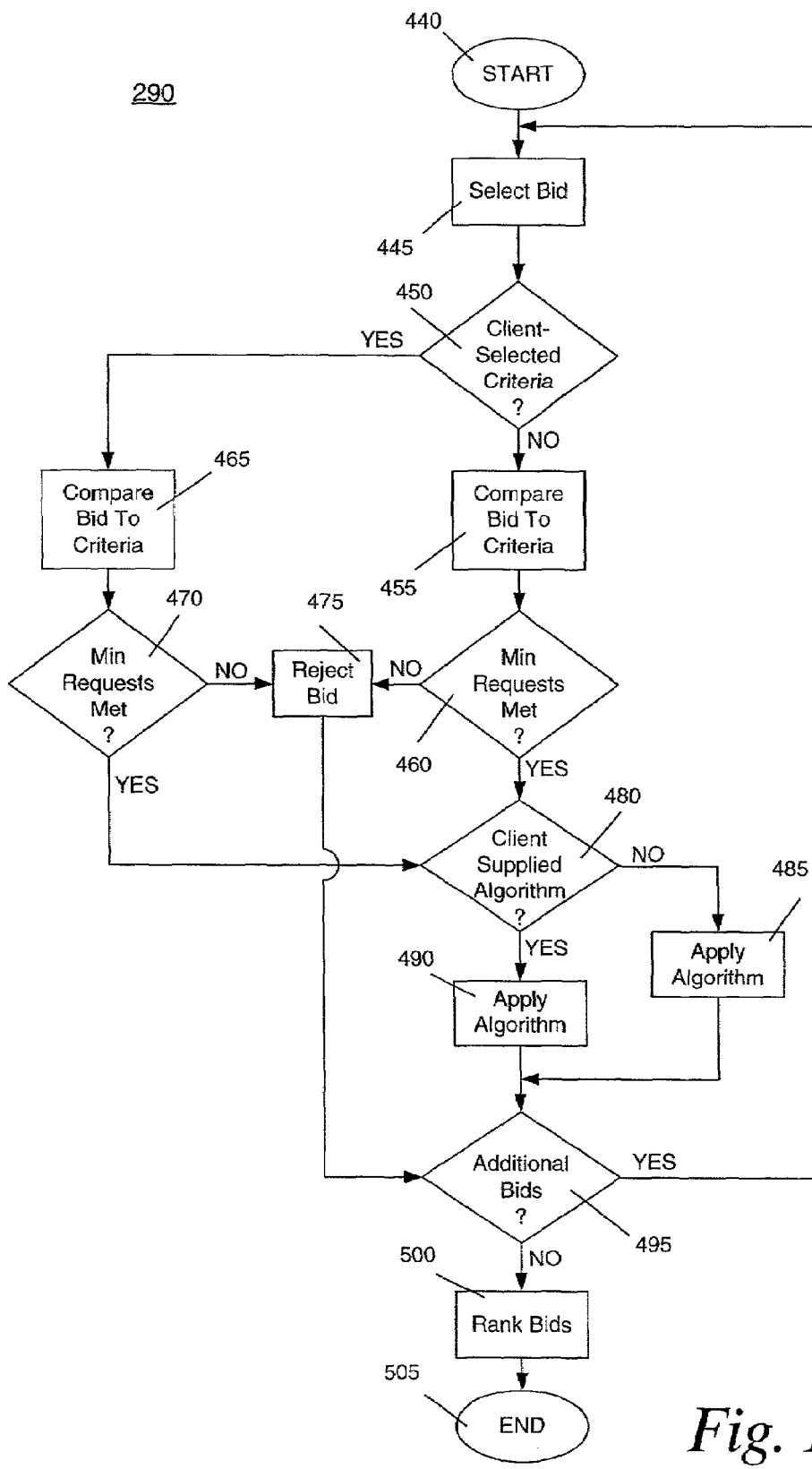

FIG. 13 is a flow chart illustrating the sub-routine 290 for evaluating bids. The sub-routine starts in block 440. In block 445, the bidding service 90 selects a first bid for analysis. In block 450, the bidding service 90 determines if the client 31 has supplied any evaluation criteria or requirements. If the client has not supplied evaluation requirements, the bidding service 90 compares the selected bid to a set of standard, minimum performance requirements, which may be industry-standard requirements block 455. In block 460, the bidding service 90 determines if the bid meets the minimum performance requirements. If the bid does not meet the minimum performance requirements, the bid is rejected, block 475. If the bid is rejected, the bidding service determines if additional bids were submitted, block 495. If additional bids were submitted, the bidding processor 90 returns to block 445 and selects the next bid for evaluation.

In block 450, if the client 31 has supplied performance requirements, the bidding service compares the selected bid to the client-supplied performance requirements, block 465. In block 470, the bidding service 90 determines if the selected bid meets the minimum criteria of the client-supplied performance requirements. If the minimum criteria are not met, the bidding service rejects the bid, block 475.

In blocks 470 and 460, if the minimum criteria are met, the bidding service 90 determines if the client 31 has supplied an evaluation algorithm. If the client 31 has not supplied an evaluation algorithm, the bidding service applies a standard evaluation algorithm, which may be an industry-standard algorithm, block 485. If the client has supplied an evaluation algorithm, the bidding service applies the client-supplied evaluation algorithm, block 490. The bidding service 90 may then store the results of the algorithm pending evaluation of all bids.

In block 495, the bidding service 90 determines if any bids remain to be evaluated. If additional bids remain, the sub-routine 290 returns to block 445, and the bidding service selects the next bid for evaluation. In block 495, if no additional bids remain for evaluation, the bidding service 90 ranks the bids, block 500. The sub-routine 290 then ends, block 505.

Figure 14:
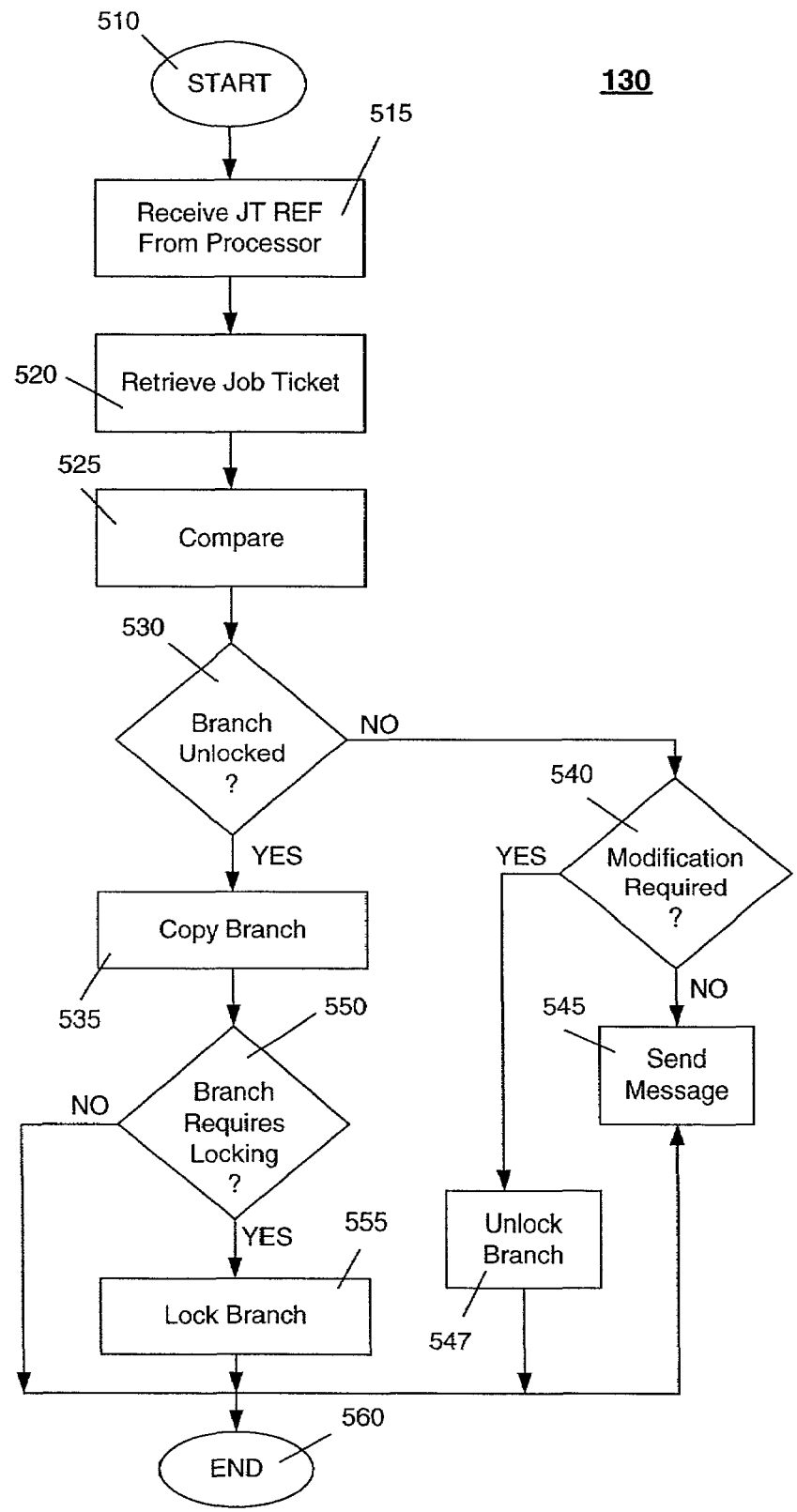

FIG. 14 is a flowchart illustrating the routine 130 for providing access to a job ticket 61. The routine 130 begins in block 510. In block 515, the job ticket service 60 receives a job ticket reference 72 from a processor 80, and retrieves the corresponding job ticket 61, block 520.

In block 525, the job ticket service 60 compares the processor identification to processors listed in the job ticket 61 or branches 66 of the job ticket 61. The job ticket service 60 determines if the selected branches 66 are locked, block 530. If the selected branches 66 are not locked, the job ticket service 60 copies the selected branches 66 to the processor 80, block 535 In block 550, the job ticket service 60 then determines if the selected branches 66 require locking. If the selected branches do not require locking, the routine 130 ends, block 560. If the selected branches 66 require locking, the job ticket service 60 locks the selected branches 66, block 555. The routine 130 then ends, block 560.

In block 530, if the selected branches 66 are locked, the job ticket service 60 determines if the processor 80 intends to modify information in the selected branches 66, block 540. If the processor 80 will not modify the selected branches 66, job ticket service 60 may provide an error message, block 545. If the selected branches 66 will be modified, job ticket service 60 may unlock the selected branches 66.

Figure 15:
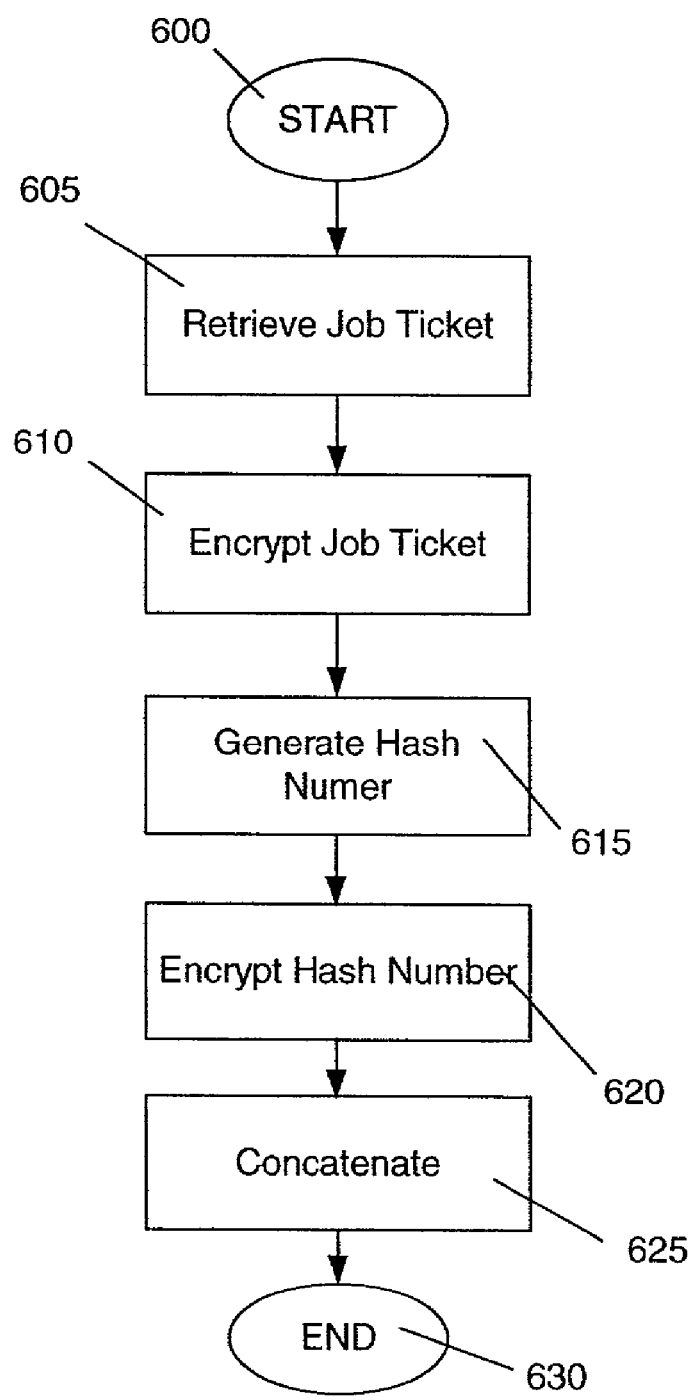

FIG. 15 is a flow diagram of a method for allowing access to a job ticket 61. The method may execute as part of the routine 115 shown in FIG. 9. The method starts with block 600. In block 605, the authentication server 94 receives authentication information from a processor 80 and retrieves a job ticket 61 corresponding to a job ticket reference 72 possessed by the processor 80. At this stage of the process, the job ticket 61 (excluding the public key signature field 67) contains two information fields, the framework 62 and the client extension 64. The framework 62 contains information such as the service ID, client IP address, expiration date and time, and processor authorization, as previously described. The client extension 64 contains information such as credit card number and zip code, also previously described. The information in the job ticket 61 (excluding the public key signature field 67) is then, for example, optionally hashed using, for example, MD5 protocol, and encrypted with a public key encryption system, block 610, generating a hash number, block 615. Other hashing or encryption techniques may also be used. The hash number is representative of the specific information contained in the job ticket 61. The hash number generated in block 615 is then encrypted using a standard public key encryption system, block 620. Encrypting the hash number with a private key prevents any user without knowledge of the public key from modifying job information. In block 625, job ticket 61 and the encrypted hash number are concatenated to generate the completed job ticket 61. Hence, the completed job ticket 61 information fields: 1) the framework 62, 2) the client extension 64, and 3) the public key signature (encrypted hash number) 67. The method then ends, block 630.

In the illustrated embodiments, the service center 40, and its sub-components, including the work flow controller 70 and the job ticket service 60, for example, may be implemented as a single, special purpose integrated circuit (e.g., an ASIC) having a main or central processor section for overall, system-level control, and separate circuits dedicated to performing various different computations, functions and other processes under control of the central processor section. Those skilled in the art will appreciate that the service center 40 may also be implemented using a plurality of separate, dedicated or programmable integrated or other electrical circuits or devices (e.g., hardwired electronic or logic circuits such as discrete element circuits, or programmable logic devices such as PLDs, PLAs, or PALs). The service center 40 may also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 9–15 can be used as the service center 40, or its sub-components.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. An apparatus that controls access to a job ticket, wherein the job ticket relates to a print job request to be executed by one or more processors coupled to a communications network, the apparatus comprising:
 a work flow controller coupled to the communications network, wherein the work flow controller is capable of defining a work flow corresponding to the job request, and capable of defining the job ticket, and wherein the work flow comprises one or more branches;
 a job ticket service that is capable of storing the job ticket and creating a job ticket reference, the job ticket service being further capable of providing the job ticket reference to multiple processors such that the multiple processors use the job ticket reference to access the stored job ticket instead of being provided with a copy of at least a portion of the job ticket, wherein the job ticket comprises a framework specifying the one or more branches, and wherein the job ticket service locks a branch when the branch is accessed by a processor;
 an access key, wherein the access key is provided to the processor accessing the branch, and wherein the processor provides the access key to the job ticket service to unlock the locked branch; and
 wherein the job ticket service comprises a key encryption system, and wherein the access key is encrypted using the key encryption system.

2. The apparatus of claim 1, wherein a branch comprises a lock/unlock flag, wherein the lock/unlock flag is set to lock to lock the branch.

3. The apparatus of claim 2, wherein the lock/unlock flag locks the branch to prevent branch modification, and wherein a second processor may access the locked branch in a read-only mode.

4. The apparatus of claim 1, wherein the processor that accesses the branch is authorized access to the branch, and wherein such authorization is stored with the job ticket.

5. The apparatus of claim 1, further comprising a job store, wherein the job store stores content corresponding to the branch, and wherein when the branch is unlocked, the processor accesses the content.

6. The apparatus of claim 1, wherein the lock/unlock flag provides an indication of lock status for the branch.

7. The apparatus of claim 1, wherein the job ticket service comprises a data table listing branches of the workflow, and wherein when the processor access a branch, the job ticket service marks the data table to indicate the branch is unavailable for modification.

8. A method for controlling access to a stored job ticket by locking branches of the job ticket, wherein the job ticket relates to a print job to be executed by one or more processors in an electronic network, the method comprising:
 identifying a branch of the job ticket;
 receiving a branch access request from a processor, the branch access request comprising a job ticket reference, the job ticket reference having been provided to the processor, instead of being provided with a copy of at least a portion of the stored job ticket, for accessing the stored job ticket;
 retrieving the stored job ticket using the job ticket reference provided by the processor;
 providing the processor with access to the branch; and
 locking the branch;
 encrypting a key wherein the key controls modification access to the branch; and
 providing the encrypted key to the processor.

9. The method of claim 8, wherein the step of locking the branch comprises setting a lock flag.

10. The method of claim 8, wherein the step of locking the branch comprises making a lock entry in a data table.

11. The method of claim 8, wherein the step of locking the branch prevents branch modification and allows read-only access to the branch.

12. The method of claim 8, further comprising returning the key to gain access to the branch for modification.

13. A method for controlling access to a stored job ticket, wherein a plurality of processors compete for selection to perform tasks related to the job ticket, said method comprising:
  defining one or more tasks to complete the job ticket, wherein the job ticket relates to a print job and comprises a node-tree having a plurality of branches, and wherein each branch of the plurality of branches includes one or more defined tasks;
  receiving a request from one or more of the plurality of processors to access one or more of the plurality of branches, each said request comprising a job ticket reference, the job ticket reference having been provided to the one or more of the plurality of processors, instead of being provided with a copy of at least a portion of the stored job ticket, for accessing the stored job ticket;
  retrieving the stored job ticket using the job ticket reference provided by each of the one or more of the plurality of processors;
  determining if a processor is currently accessing one or more of the plurality of branches;
  for branches not being accessed, determining if the requesting one or more processors is authorized to access the branches;
  for branches for which access is authorized, copying information from the branches to the authorized processors;
  locking the accessed branches;
  for each locked branch, encrypting a key wherein the key controls modification access to the associated locked branch; and
  providing the encrypted key to the processor authorized to access the associated locked branch.

14. The method of claim 13, wherein a processor accessing a branch modifies the branch information, further comprising: unlocking the branch; and copying the modified branch information to the job ticket.

15. The method of claim 13, wherein the step of locking the branch comprises setting a lock flag at the branch.

16. The method of claim 13, wherein the step of locking the branch prevents branch information modification and allows read-only access to the locked branch.

17. A program storage device readable by a machine, tangibly embodying a program of instructions executable by the machine to perform method steps for controlling access to a stored job ticket, the job ticket corresponding to a print job, wherein a plurality of processors compete for selection to perform tasks related to the job ticket, the method steps, comprising:
  defining one or more tasks to complete the job ticket, wherein the job ticket comprises a node-tree having a plurality of branches, and wherein each branch of the plurality of branches includes one or more defined tasks;
  receiving a request from one or more of the plurality of processors to access one or more of the plurality of branches, each said request comprising a job ticket reference, the job ticket reference having been provided to the one or more of the plurality of processors, instead of being provided with a copy of at least a portion of the stored job ticket, for accessing the stored job ticket;
  retrieving the stored job ticket using the job ticket reference provided by each of the one or more of the plurality of processors;
  determining if a processor is currently accessing one or more of the plurality of branches;
  for branches not being accessed, determining if the requesting one or more processors is authorized to access the branches;
  for branches for which access is authorized, copying information from the branches to the authorized processors;
  locking the accessed branches;
  for each locked branch, encrypting a key wherein the key controls modification access to the associated locked branch; and
  providing the encrypted key to the processor authorized to access the associated locked branch.

18. The program storage device of claim 17, wherein a processor accessing a branch modifies the branch information, the method steps further comprising: unlocking the branch; and copying the modified branch information to the job ticket.

19. The apparatus of claim 1, wherein the job ticket service permits simultaneous access to the stored job ticket to more than one of the multiple processors by use of the job ticket reference.

* * * * *

UNITED STATES PATENT AND TRADEMARK OFFICE
CERTIFICATE OF CORRECTION

| | | |
|---|---|---|
| PATENT NO. | : 7,207,069 B2 | |
| APPLICATION NO. | : 09/873195 | |
| DATED | : April 17, 2007 | |
| INVENTOR(S) | : Ward S. Foster et al. | |

It is certified that error appears in the above-identified patent and that said Letters Patent is hereby corrected as shown below:

Title Pg, Item (75), in "Inventors", delete "Ward Foster" and insert -- Ward S. Foster --, therefor.

In column 1, line 29, after "generate" insert -- a --.

In column 2, line 66, after "defines" insert -- the --.

In column 3, line 2, after "where" insert -- the --.

In column 4, line 4, after "ticket" insert -- file --.

In column 4, line 18, after "to" insert -- the --.

In column 4, line 37, after "complete" insert -- the --.

In column 5, line 29, after "Moreover," insert -- the --.

In column 5, line 32, after "and" insert -- a --.

In column 6, line 40, after "bus" insert -- 41 --.

In column 6, line 42, after "is" insert -- a --.

In column 6, line 56, after "allow" insert -- the --.

In column 7, line 21, after "above," insert -- the --.

In column 7, line 23, after "but" insert -- the --.

In column 7, line 37, after "acquire" insert -- the --.

In column 7, line 47, after "lock" insert -- the --.

In column 8, line 2, after "accessing" insert -- the --.

In column 8, line 29, after "of" insert -- the --.

In column 8, line 31, after "by" insert -- the --.

In column 8, line 58, after "in" insert -- the --.

UNITED STATES PATENT AND TRADEMARK OFFICE
CERTIFICATE OF CORRECTION

| | |
|---|---|
| PATENT NO. | : 7,207,069 B2 |
| APPLICATION NO. | : 09/873195 |
| DATED | : April 17, 2007 |
| INVENTOR(S) | : Ward S. Foster et al. |

It is certified that error appears in the above-identified patent and that said Letters Patent is hereby corrected as shown below:

In column 9, line 3, after "complete" insert -- the --.

In column 9, line 8, after "in" insert -- the --.

In column 10, line 20, after "and" insert -- 94 --.

In column 10, line 31, after "validate" insert -- the --.

In column 12, line 13, after "in" insert -- the --.

In column 12, line 19, delete "servic" and insert -- service --, therefor.

In column 12, line 33, after "protects" insert -- the --.

In column 14, line 18, after "at" insert -- the --.

In column 14, line 30, after "example," insert -- the --.

In column 14, line 47, after "allows" insert -- the --.

In column 15, line 35, after "use of" insert -- a --.

In column 16, line 10, after "access" insert -- the --.

In column 16, line 11, after "passing" insert -- the --.

In column 16, line 36, after "of" insert -- the --.

In column 16, line 44, after "60," insert -- the --.

In column 16, line 45, after "to" insert -- the --.

In column 17, line 14, after "complete" insert -- the --.

In column 17, line 41, after "refers to" insert -- a --.

In column 18, line 4, after "receive" insert -- the --.

In column 18, line 25, after "of" insert -- the --.

In column 18, line 31, after "to" insert -- a --.

In column 18, line 32, after "to" insert -- the --.

UNITED STATES PATENT AND TRADEMARK OFFICE
CERTIFICATE OF CORRECTION

PATENT NO. : 7,207,069 B2
APPLICATION NO. : 09/873195
DATED : April 17, 2007
INVENTOR(S) : Ward S. Foster et al.

It is certified that error appears in the above-identified patent and that said Letters Patent is hereby corrected as shown below:

In column 18, line 55, insert -- the -- before "job ticket".

In column 18, line 64, after "145," insert -- the --.

In column 19, line 11, after "in" insert -- the --.

In column 19, line 35, after "submitting" insert -- the --.

In column 20, line 6, after "posts" insert -- the --.

In column 20, line 23, after "service" insert -- 90 --.

In column 20, line 28, after "service" insert -- 90 --.

In column 20, line 33, after "service" insert -- 90 --.

In column 20, line 40, after "service" insert -- 90 --.

In column 21, line 5, after "66," insert -- the --.

In column 21, line 7, after "modified," insert -- the --.

In column 21, line 32, after "modifying" insert -- the --.

In column 21, line 33, after "625," insert -- the --.

In column 22, line 29, in Claim 2, after "set" delete "to lock".

In column 22, line 63, in Claim 8, after "branch;" delete "and".

Signed and Sealed this

Eleventh Day of August, 2009

David J. Kappos
*Director of the United States Patent and Trademark Office*